United States Patent
Oyman

(10) Patent No.: US 11,588,871 B2
(45) Date of Patent: Feb. 21, 2023

(54) STREAMING OF VOLUMETRIC POINT CLOUD CONTENT BASED ON SESSION DESCRIPTION PROTOCOLS AND REAL TIME PROTOCOLS

(71) Applicant: Apple Inc., Cupertino, CA (US)

(72) Inventor: Ozgur Oyman, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 159 days.

(21) Appl. No.: 16/931,181

(22) Filed: Jul. 16, 2020

(65) Prior Publication Data

US 2021/0021664 A1 Jan. 21, 2021

Related U.S. Application Data

(60) Provisional application No. 62/874,873, filed on Jul. 16, 2019.

(51) Int. Cl.
*H04L 65/65* (2022.01)
*H04N 19/70* (2014.01)
(Continued)

(52) U.S. Cl.
CPC .............. *H04L 65/65* (2022.05); *G06T 9/00* (2013.01); *G06T 15/00* (2013.01); *G06T 15/10* (2013.01);
(Continued)

(58) Field of Classification Search
CPC ..... H04L 65/608; H04L 65/607; H04L 65/80; H04L 67/38; H04L 65/1006; H04L 65/1069; G06T 9/00; G06T 15/00; G06T 15/10; G06T 15/08; H04N 13/194; H04N 19/70; H04N 21/6437; H04N 19/597
See application file for complete search history.

(56) References Cited

U.S. PATENT DOCUMENTS

2009/0303255 A1 12/2009 Paila et al.
2017/0214720 A1* 7/2017 Inamdar .............. H04L 65/1066
(Continued)

FOREIGN PATENT DOCUMENTS

| WO | WO 2018075090 | 4/2018 |
| WO | WO 2019129923 | 7/2019 |
| WO | WO 2019135024 | 7/2019 |

OTHER PUBLICATIONS

PCT International Search Report and Written Opinion in International Appln. No. PCT/US2020/042330, dated Sep. 29, 2020, 15 pages.
(Continued)

*Primary Examiner* — Richard T Torrente
(74) *Attorney, Agent, or Firm* — Fish & Richardson P.C.

(57) ABSTRACT

A process for real time protocol (RTP) data streaming includes generating a plurality of codec bitstreams, each codec bitstream being configured to carry encoded information that includes one of occupancy map data, geometry data, or attribute data for a volumetric video. The process includes generating, for each codec bitstream of the plurality, a dedicated RTP stream, the dedicated RTP stream including a RTP payload format based on the respective codec bitstream for that RTP stream. The process includes multiplexing each dedicated RTP stream into a result RTP stream for the volumetric video.

20 Claims, 8 Drawing Sheets

(51) Int. Cl.
    *G06T 9/00*         (2006.01)
    *H04L 65/80*      (2022.01)
    *H04N 13/194*    (2018.01)
    *G06T 15/00*     (2011.01)
    *G06T 15/10*     (2011.01)
    *H04L 65/70*     (2022.01)
    *H04L 67/131*    (2022.01)
    *G06T 15/08*     (2011.01)

(52) U.S. Cl.
    CPC .............. *H04L 65/70* (2022.05); *H04L 65/80* (2013.01); *H04L 67/131* (2022.05); *H04N 13/194* (2018.05); *H04N 19/70* (2014.11); *G06T 15/08* (2013.01)

(56) References Cited

U.S. PATENT DOCUMENTS

| | | | |
|---|---|---|---|
| 2019/0215729 A1 | 7/2019 | Oyman et al. | |
| 2019/0318488 A1* | 10/2019 | Lim | H04N 21/8547 |
| 2020/0053392 A1* | 2/2020 | Hannuksela | H04N 19/46 |
| 2020/0195946 A1* | 6/2020 | Choi | H04N 19/70 |
| 2021/0160552 A1* | 5/2021 | Fang | H04N 21/64322 |

OTHER PUBLICATIONS

PCT International Preliminary Report on Patentability in International Appln. No. PCT/US2020/042330, dated Jan. 27, 2022, 9 pages.

No Author Listed], "3rd Generation Partnership Project; Technical Specification Group Services and System Aspects; IP Multimedia Subsystem (IMS); Multimedia Telephony; Media handling and interaction (Release 16)," 3GPP TS 26.114 V16.2.0, Jun. 2019, 414 pages.

No Author Listed], "Universal Mobile Telecommunications System (UMTS); LTE; Study on improved streaming Quality of Experience (QoE) reporting in 3GPP services and networks (3GPP TR 26.909 version 15.0.0 Release 15)," ETSI TR 126 909 V15.0.0, Jul. 2018, 32 pages.

\* cited by examiner

STREAMING OF VOLUMETRIC POINT CLOUD CONTENT BASED ON SESSION DESCRIPTION PROTOCOLS AND REAL TIME PROTOCOLS

CROSS-REFERENCE TO RELATED APPLICATION

This application claims priority to U.S. Provisional Patent Application No. 62/874,873, titled SDP AND RTP-BASED METHODS FOR STREAMING OF VOLUMETRIC POINT CLOUD CONTENT, filed Jul. 16, 2019, the entire content of which is incorporated herein by reference.

TECHNICAL FIELD

This disclosure relates generally to wireless communications, including protocols for streaming data.

BACKGROUND

Wireless communication systems are rapidly growing in usage. Further, wireless communication technology has evolved from voice-only communications to also include the transmission of data, such as Internet and multimedia content, to a variety of devices. To accommodate a growing number of devices communicating both voice and data signals, many wireless communication systems share the available communication channel resources among devices.

SUMMARY

This specification describes session description protocol (SDP) based procedures and real time protocol (RTP) based procedures to support streaming of volumetric video content. Generally, volumetric content distribution can be configured to deliver 6 degree of freedom (6 DoF) immersive media experiences. Real-time delivery protocols such as RTP and session management protocols such as SDP are updated in order to provide the means to share volumetric content in real time.

In a general aspect, a process for real time protocol (RTP) data streaming includes generating a plurality of codec bitstreams, each codec bitstream being configured to carry encoded information that includes one of occupancy map data, geometry data, or attribute data for a volumetric video. The process includes generating, for each codec bitstream of the plurality, a dedicated RTP stream, the dedicated RTP stream including a RTP payload format based on the respective codec bitstream for that RTP stream. The process includes multiplexing each dedicated RTP stream into a result RTP stream for the volumetric video.

In an embodiment, the process includes performing video-based point cloud coding (V-PCC) using the result RTP stream. In an embodiment, each codec bitstream includes a high efficiency video coding (HEVC) bitstream.

In an embodiment, the process includes generating an additional dedicated RTP stream including a compressed patch sequence sub-stream. In an embodiment, the process includes multiplexing the additional RTP stream into the result RTP stream for V-PCC video.

In an embodiment, the process includes generating an RTP header extension of the result RTP stream, the RTP header extension configured to include a compressed patch sequence substream.

In an embodiment, the process includes generating one or more session description protocol (SDP) attributes to indicate capabilities for carriage of point cloud video as part of the result RTP stream.

In an embodiment, the one or more SDP attributes for the result RTP stream indicate at least one of: an ability to carry encoded point cloud information on occupancy map data, geometry data, attribute data and patch sequence data in dedicated RTP streams; an ability to carry the dedicated RTP streams on point cloud information such as occupancy map data, geometry data, attribute data, and patch sequence data in a single multiplexed RTP stream; an ability to carry a sequence parameter set (SPS) unit type information in an RTP header extension; an ability to carry point cloud metadata information as part of the RTP payload format; and an ability to support codec capabilities to satisfy a minimum quality requirement for point cloud video.

In an embodiment, the RTP payload format comprises at least one supplemental information enhancement (SEI) message, wherein data carried in a point cloud video specific SEI message are used in a rendering phase at a receiver.

In an embodiment, the one or more SDP attributes indicate at least one of: an ability to signal a desired viewport using an RTCP feedback message; and an ability to signal an actually transmitted viewport using an RTP header extension message. In an embodiment, each dedicated RTP stream includes a distinct media type.

In a general aspect, a user equipment (UE) is configured for real time protocol (RTP) data streaming. The UE includes processing circuitry configured to generate a plurality of codec bitstreams, each codec bitstream being configured to carry encoded information that includes one of occupancy map data, geometry data, or attribute data for a volumetric video. The processing circuitry is configured to generate, for each codec bitstream of the plurality, a dedicated RTP stream, the dedicated RTP stream including a RTP payload format based on the respective codec bitstream for that RTP stream. The processing circuitry is configured to multiplex each dedicated RTP stream into a result RTP stream for the volumetric video. The UE includes baseband circuitry coupled with the processing circuitry, the baseband circuitry being configured to generate the result RTP stream for sending to a networked device.

In an embodiment, the processing circuitry is further configured to perform video-based point cloud coding (V-PCC) using the result RTP stream. In an embodiment, each codec bitstream includes a high efficiency video coding (HEVC) bitstream.

In an embodiment, the processing circuitry is further configured to generate an additional dedicated RTP stream including a compressed patch sequence sub-stream. In an embodiment, the processing circuitry is further configured to multiplex the additional RTP stream into the result RTP stream for V-PCC video.

In an embodiment, the processing circuitry is further configured to generate an RTP header extension of the result RTP stream. The RTP header extension is configured to include a compressed patch sequence substream.

In an embodiment, the processing circuitry is further configured to generate one or more session description protocol (SDP) attributes to indicate capabilities for carriage of point cloud video as part of the result RTP stream.

In an embodiment, the one or more SDP attributes for the result RTP stream indicate at least one of: an ability to carry encoded point cloud information on occupancy map data, geometry data, attribute data and patch sequence data in dedicated RTP streams; an ability to carry the dedicated RTP streams on point cloud information such as occupancy map data, geometry data, attribute data, and patch sequence data in a single multiplexed RTP stream; an ability to carry a sequence parameter set (SPS) unit type information in an RTP header extension; an ability to carry point cloud metadata information as part of the RTP payload format; and an ability to support codec capabilities to satisfy a minimum quality requirement for point cloud video.

In an embodiment, the RTP payload format comprises at least one supplemental information enhancement (SEI) message. Data carried in a point cloud video specific SEI message are used in a rendering phase at a receiver.

In an embodiment, the one or more SDP attributes indicate at least one of: an ability to signal a desired viewport using an RTCP feedback message; and an ability to signal an actually transmitted viewport using an RTP header extension message. In an embodiment, each dedicated RTP stream includes a distinct media type.

In some embodiments, the process is performed by a network element, a UE, or base station, such as a next generation node (gNB). In some implementations, one or more non-transitory computer readable media store instructions that when executed by at least one processing device cause the at least one processing device (or another device in communication with the at least one processing device) to perform the process.

In a general aspect, a process for real time protocol (RTP) data streaming includes de-multiplexing, into a plurality of codec bitstreams, an RTP stream representing volumetric video. The process includes decoding, from the plurality of codex bitstreams, texture data comprising occupancy map data, geometry data, and attribute data for the volumetric video. The process includes generating, from the texture data, a point cloud reconstruction for the volumetric video. The process includes rendering the volumetric video based on the point cloud reconstruction.

In embodiments, the process includes decoding, from the plurality of codec bitstreams, one or more supplemental information enhancement (SEI) messages including metadata for rendering the volumetric video.

In embodiments, the process includes decoding, from the plurality of codec bitstreams, patch sequence data, wherein generating the point cloud reconstruction is based on the patch sequence data.

In embodiments, rendering the volumetric video includes receiving, from a sensor associated with a device configured to display the volumetric video, sensor data indicative of a position of the display and rendering the volumetric video based on the sensor data indicative of the position. In embodiments, each codec bitstream includes a high efficiency video coding (HEVC) bitstream.

In embodiments, the process includes receiving an RTP header extension of the RTP stream, the RTP header extension configured to include a compressed patch sequence substream. In embodiments, the process includes receiving data including one or more session description protocol (SDP) attributes to indicate capabilities for carriage of point cloud video as part of the RTP stream.

In embodiments, one or more SDP attributes for the RTP stream indicate at least one of: an ability to carry encoded point cloud information on occupancy map data, geometry data, attribute data and patch sequence data in dedicated RTP streams; an ability to carry the dedicated RTP streams on point cloud information such as occupancy map data, geometry data, attribute data, and patch sequence data in a single multiplexed RTP stream; an ability to carry a sequence parameter set (SPS) unit type information in an RTP header extension; an ability to carry point cloud metadata information as part of the RTP payload format; and an ability to support codec capabilities to satisfy a minimum quality requirement for point cloud video.

In embodiments, the one or more SDP attributes indicate at least one of: an ability to signal a desired viewport using an RTCP feedback message; and an ability to signal an actually transmitted viewport using an RTP header extension message.

In embodiments, each codec bitstream includes a distinct media type.

In embodiments, the method is performed by a user equipment (UE), a networked device, or an access node (AN).

The details of one or more implementations are set forth in the accompanying drawings and the description below. Other features and advantages will be apparent from the description and drawings, and from the claims.

BRIEF DESCRIPTION OF DRAWINGS

Like reference symbols in the various drawings indicate like elements.

DETAILED DESCRIPTION

This specification describes session description protocol (SDP) based procedures and real time protocol (RTP) based procedures to support streaming of volumetric video content. Generally, volumetric content distribution can be configured to deliver 6 degree of freedom (6 DoF) immersive media experiences. Real-time delivery protocols such as RTP and session management protocols such as SDP are updated in order to provide the means to share volumetric content in real time.

Volumetric video can be configured for delivering real time or near real time 6 DoF experiences. Volumetric video includes spatial data and enables viewers to walk around and interact with people and objects. Volumetric video is more immersive than 360-degree based video footage because volumetric video captures movements in an environment in three dimensions (3D). For example, the volumetric video can capture movements of people or objects in 3D. A viewer or user of the volumetric video can view these movements from any angle by using positional tracking.

Point clouds are a volumetric representation for describing 3D objects or scenes. A point cloud can include a set of unordered data points in a 3D space, each of which is specified by a respective spatial (x, y, z) position (or other coordinates). In some implementations, each point of the point cloud can have associated attributes, such as red-green-blue (RGB) color data, surface normal data, and reflectance data. In other words, the point clouds are approximately a 3D equivalent of well-known pixels for representing two-dimensional (2D) videos. The data points collectively describe the 3D geometry and texture of the scene or object. In some implementations, a point cloud may be voxelized by quantizing the point positions to lie on an integer grid within a bounding cube, which can enable more efficient real time processing. Generally, a voxel occupied if it contains any point of the point cloud.

Such a volumetric representation lends itself to immersive forms of interaction and presentation with 6 DoF. Because point cloud representations require a relatively large amount of data in comparison with 3D video, development of efficient compression techniques is desirable in order to reach consumers using typical broadband access systems. This specification describes efficient compression techniques to enable real time streaming of volumetric data in a typical broadband access system.

Figure 1:
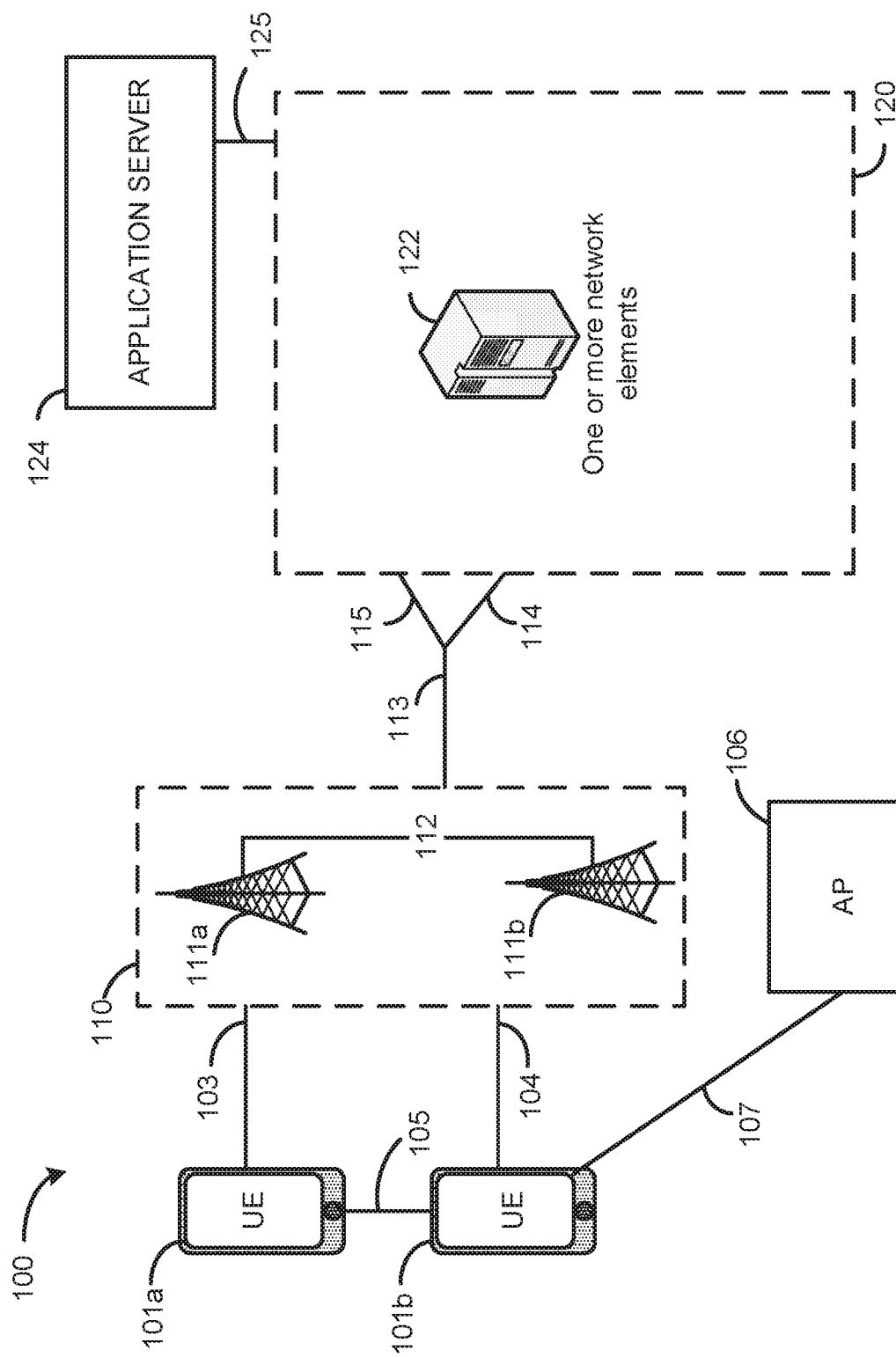
FIG. 1 illustrates an example wireless communication system, according to various embodiments herein.

FIG. 1 illustrates an example wireless communication system 100. For purposes of convenience and without limitation, the example system 100 is described in the context of the LTE and 5G NR communication standards as defined by the Third Generation Partnership Project (3GPP) technical specifications. More specifically, the wireless communication system 100 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless communication system 100 may also be a Standalone (SA) network that incorporates only NR. Furthermore, other types of communication standards are possible, including future 3GPP systems (e.g., Sixth Generation (6G)) systems, IEEE 802.16 protocols (e.g., WMAN, WiMAX, etc.), or the like.

The system 100 includes UE 101a and UE 101b (collectively referred to as the "UEs 101"). In this example, the UEs 101 are illustrated as smartphones (e.g., handheld touchscreen mobile computing devices connectable to one or more cellular networks). In other examples, any of the UEs 101 may include other mobile or non-mobile computing devices, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M) devices, Internet of Things (IoT) devices, or combinations of them, among others.

In some examples, any of the UEs 101 may be IoT UEs, which can include a network access layer designed for low-power IoT applications utilizing short-lived UE connections. An IoT UE can utilize technologies such as M2M or MTC for exchanging data with an MTC server or device using, for example, a public land mobile network (PLMN), proximity services (ProSe), device-to-device (D2D) communication, sensor networks, IoT networks, or combinations of them, among others. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages or status updates) to facilitate the connections of the IoT network.

The UEs 101 are configured to connect (e.g., communicatively couple) with an access network (AN) or radio access network (RAN) 110. In some examples, the RAN 110 may be a next generation RAN (NG RAN), an evolved UMTS terrestrial radio access network (E-UTRAN), or a legacy RAN, such as a UMTS terrestrial radio access network (UTRAN) or a GSM EDGE radio access network (GERAN). As used herein, the term "NG RAN" may refer to a RAN 110 that operates in a 5G NR system 100, and the term "E-UTRAN" may refer to a RAN 110 that operates in an LTE or 4G system 100.

To connect to the RAN 110, the UEs 101 utilize connections (or channels) 103 and 104, respectively, each of which may include a physical communications interface or layer, as described below. In this example, the connections 103 and 104 are illustrated as an air interface to enable communicative coupling, and can be consistent with cellular communications protocols, such as a global system for mobile communications (GSM) protocol, a code-division multiple access (CDMA) network protocol, a push-to-talk (PTT) protocol, a PTT over cellular (POC) protocol, a universal mobile telecommunications system (UMTS) protocol, a 3GPP LTE protocol, a 5G NR protocol, or combinations of them, among other communication protocols. In some examples, the UEs 101 may directly exchange communication data using an interface 105, such as a ProSe interface. The interface 105 may alternatively be referred to as a sidelink interface 105 and may include one or more logical channels, such as a physical sidelink control channel (PSCCH), a physical sidelink shared channel (PSSCH), a physical sidelink downlink channel (PSDCH), or a physical sidelink broadcast channel (PSBCH), or combinations of them, among others.

The UE 101b is shown to be configured to access an access point (AP) 106 (also referred to as "WLAN node 106," "WLAN 106," "WLAN Termination 106," "WT 106" or the like) using a connection 107. The connection 107 can include a local wireless connection, such as a connection consistent with any IEEE 802.11 protocol, in which the AP 106 would include a wireless fidelity (Wi-Fi®) router. In this example, the AP 106 is shown to be connected to the Internet without connecting to the core network of the wireless system, as described in further detail below. In various examples, the UE 101b, RAN 110, and AP 106 may be configured to use LTE-WLAN aggregation (LWA) operation or LTW/WLAN radio level integration with IPsec tunnel (LWIP) operation. The LWA operation may involve the UE 101b in RRC_CONNECTED being configured by a RAN node 111a, 111b to utilize radio resources of LTE and WLAN. LWIP operation may involve the UE 101b using WLAN radio resources (e.g., connection 107) using IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data or voice connectivity, or both, between a network and one or more users. These access nodes can be referred to as base stations (BS), gNodeBs, gNBs, eNodeBs, eNBs, NodeBs, RAN nodes, rode side units (RSUs), transmission reception points (TRxPs or TRPs), and the link, and can include ground stations (e.g., terrestrial access points) or satellite stations providing coverage within a geographic area (e.g., a cell), among others. As used herein, the term "NG RAN node" may refer to a RAN node 111 that operates in an 5G NR system 100 (for example, a gNB), and the term "E-UTRAN node" may refer to a RAN node 111 that operates in an LTE or 4G system 100 (e.g., an eNB). In some examples, the RAN nodes 111 may be implemented as one or more of a dedicated physical device such as a macrocell base station, or a low power (LP) base station for providing femtocells, picocells or other like cells having smaller coverage areas, smaller user capacity, or higher bandwidth compared to macrocells.

In some examples, some or all of the RAN nodes 111 may be implemented as one or more software entities running on server computers as part of a virtual network, which may be referred to as a cloud RAN (CRAN) or a virtual baseband unit pool (vBBUP). The CRAN or vBBUP may implement a RAN function split, such as a packet data convergence protocol (PDCP) split in which radio resource control (RRC) and PDCP layers are operated by the CRAN/vBBUP and other layer two (e.g., data link layer) protocol entities are operated by individual RAN nodes 111; a medium access control (MAC)/physical layer (PHY) split in which RRC, PDCP, MAC, and radio link control (RLC) layers are operated by the CRAN/vBBUP and the PHY layer is operated by individual RAN nodes 111; or a "lower PHY" split in which RRC, PDCP, RLC, and MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform, for example, other virtualized applications. In some examples, an individual RAN node 111 may represent individual gNB distributed units (DUs) that are connected to a gNB central unit (CU) using individual F1 interfaces (not shown in FIG. 1). In some examples, the gNB-DUs may include one or more remote radio heads or RFEMs, and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), including RAN nodes that provide E-UTRA user plane and control plane protocol terminations toward the UEs 101, and are connected to a 5G core network (e.g., core network 120) using a next generation interface.

In vehicle-to-everything (V2X) scenarios, one or more of the RAN nodes 111 may be or act as RSUs. The term "Road Side Unit" or "RSU" refers to any transportation infrastructure entity used for V2X communications. A RSU may be implemented in or by a suitable RAN node or a stationary (or relatively stationary) UE, where a RSU implemented in or by a UE may be referred to as a "UE-type RSU," a RSU implemented in or by an eNB may be referred to as an "eNB-type RSU," a RSU implemented in or by a gNB may be referred to as a "gNB-type RSU," and the like. In some examples, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications or other software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) or provide connectivity to one or more cellular networks to provide uplink and downlink communications, or both. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller or a backhaul network, or both.

Any of the RAN nodes 111 can terminate the air interface protocol and can be the first point of contact for the UEs 101. In some examples, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In some examples, the UEs 101 can be configured to communicate using orthogonal frequency division multiplexing (OFDM) communication signals with each other or with any of the RAN nodes 111 over a multicarrier communication channel in accordance with various communication techniques, such as, but not limited to, OFDMA communication techniques (e.g., for downlink communications) or SC-FDMA communication techniques (e.g., for uplink and ProSe or sidelink communications), although the scope of the techniques described here not limited in this respect. The OFDM signals can comprise a plurality of orthogonal subcarriers.

In some examples, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

In some examples, the UEs 101 and the RAN nodes 111 communicate (e.g., transmit and receive) data over a licensed medium (also referred to as the "licensed spectrum" or the "licensed band") and an unlicensed shared medium (also referred to as the "unlicensed spectrum" or the "unlicensed band"). The licensed spectrum may include channels that operate in the frequency range of approximately 400 MHz to approximately 3.8 GHz, whereas the unlicensed spectrum may include the 5 GHz band. NR in the unlicensed spectrum may be referred to as NR-U, and LTE in an unlicensed spectrum may be referred to as LTE-U, licensed assisted access (LAA), or MulteFire.

To operate in the unlicensed spectrum, the UEs 101 and the RAN nodes 111 may operate using license assisted access (LAA), enhanced-LAA (eLAA), or further enhanced-LAA (feLAA) mechanisms. In these implementations, the UEs 101 and the RAN nodes 111 may perform one or more known medium-sensing operations or carrier-sensing operations, or both, to determine whether one or more channels in the unlicensed spectrum are unavailable or otherwise occupied prior to transmitting in the unlicensed spectrum. The medium/carrier sensing operations may be performed according to a listen-before-talk (LBT) protocol. LBT is a mechanism in which equipment (for example, UEs 101, RAN nodes 111) senses a medium (for example, a channel or carrier frequency) and transmits when the medium is sensed to be idle (or when a specific channel in the medium is sensed to be unoccupied). The medium sensing operation may include clear channel assessment (CCA), which uses energy detection to determine the presence or absence of other signals on a channel in order to determine if a channel is occupied or clear. This LBT mechanism allows cellular/LAA networks to coexist with incumbent systems in the unlicensed spectrum and with other LAA networks. Energy detection may include sensing RF energy across an intended transmission band for a period of time and comparing the sensed RF energy to a predefined or configured threshold.

The incumbent systems in the 5 GHz band can be WLANs based on IEEE 802.11 technologies. WLAN employs a contention-based channel access mechanism (e.g., CSMA with collision avoidance (CSMA/CA)). In some examples, when a WLAN node (e.g., a mobile station (MS), such as UE 101, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the contention window size (CWS), which is increased exponentially upon the occurrence of collision and reset to a minimum value as the transmission succeeds. In some examples, the LBT mechanism designed for LAA is similar to the CSMA/CA of WLAN. In some examples, the LBT procedure for DL or UL transmission bursts, including PDSCH or PUSCH transmissions, respectively, may have an LAA contention window that is variable in length between X and Y extended CAA (ECCA) slots, where X and Y are minimum and maximum values for the CWSs for LAA. In one example, the minimum CWS for an LAA transmission may be 9 microseconds (μs); however, the size of the CWS and a maximum channel occupancy time (for example, a transmission burst) may be based on governmental regulatory requirements.

In some examples, the LAA mechanisms are built on carrier aggregation technologies of LTE-Advanced systems. In CA, each aggregated carrier is referred to as a component carrier. In some examples, a component carrier may have a bandwidth of 1.4, 3, 5, 10, 15 or 20 MHz, and a maximum of five component carriers can be aggregated to provide a maximum aggregated bandwidth is 100 MHz. In frequency division duplex (FDD) systems, the number of aggregated carriers can be different for DL and UL. For example, the number of UL component carriers can be equal to or lower than the number of DL component carriers. In some cases, individual component carriers can have a different bandwidth than other component carriers. In time division duplex (TDD) systems, the number of component carriers as well as the bandwidths of each component carrier is usually the same for DL and UL.

Carrier aggregation can also include individual serving cells to provide individual component carriers. The coverage of the serving cells may differ, for example, because component carriers on different frequency bands may experience different path loss. A primary service cell (PCell) may provide a primary component carrier for both UL and DL, and may handle RRC and non-access stratum (NAS) related activities. The other serving cells are referred to as secondary component carriers (SCells), and each SCell may provide an individual secondary component carrier for both UL and DL. The secondary component carriers may be added and removed as required, while changing the primary component carrier may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 101. The PDCCH carries information about the transport format and resource allocations related to the PDSCH channel, among other things. It may also inform the UEs 101 about the transport format, resource allocation, and hybrid automatic repeat request (HARD) information related to the uplink shared channel. Downlink scheduling (e.g., assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses control channel elements (CCEs) to convey the control information. Before being mapped to resource elements, the PDCCH complex-valued symbols may first be organized into quadruplets, which may then be permuted using a sub-block interleaver for rate matching. In some examples, each PDCCH may be transmitted using one or more of these CCEs, in which each CCE may correspond to nine sets of four physical resource elements collectively referred to as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. In LTE, there can be four or more different PDCCH formats defined with different numbers of CCEs (e.g., aggregation level, L=1, 2, 4, or 8).

Some implementations may use concepts for resource allocation for control channel information that are an extension of the above-described concepts. For example, some implementations may utilize an enhanced PDCCH (EPDCCH) that uses PDSCH resources for control information transmission. The EPDCCH may be transmitted using one or more enhanced CCEs (ECCEs). Similar to above, each ECCE may correspond to nine sets of four physical resource elements collectively referred to as an enhanced REG (EREG). An ECCE may have other numbers of EREGs in some examples.

The RAN nodes 111 are configured to communicate with one another using an interface 112. In examples, such as where the system 100 is an LTE system (e.g., when the core network 120 is an evolved packet core (EPC) network), the interface 112 may be an X2 interface 112. The X2 interface may be defined between two or more RAN nodes 111 (e.g., two or more eNBs and the like) that connect to the EPC 120, or between two eNBs connecting to EPC 120, or both. In some examples, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB to a secondary eNB; information about successful in sequence delivery of PDCP protocol data units (PDUs) to a UE 101 from a secondary eNB for user data; information of PDCP PDUs that were not delivered to a UE 101; information about a current minimum desired buffer size at the secondary eNB for transmitting to the UE user data, among other information. The X2-C may provide intra-LTE access mobility functionality, including context transfers from source to target eNBs or user plane transport control; load management functionality; inter-cell interference coordination functionality, among other functionality.

In some examples, such as where the system 100 is a 5G NR system (e.g., when the core network 120 is a 5G core network), the interface 112 may be an Xn interface 112. The Xn interface may be defined between two or more RAN nodes 111 (e.g., two or more gNBs and the like) that connect to the 5G core network 120, between a RAN node 111 (e.g., a gNB) connecting to the 5G core network 120 and an eNB, or between two eNBs connecting to the 5G core network 120, or combinations of them. In some examples, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111, among other functionality. The mobility support may include context transfer from an old (source) serving RAN node 111 to new (target) serving RAN node 111, and control of user plane tunnels between old (source) serving RAN node 111 to new (target) serving RAN node 111. A protocol stack of the Xn-U may include a transport network layer built on Internet Protocol (IP) transport layer, and a GPRS tunneling protocol for user plane (GTP-U) layer on top of a user datagram protocol (UDP) or IP layer(s), or both, to carry user plane PDUs. The Xn-C protocol stack may include an application layer signaling protocol (referred to as Xn Application Protocol (Xn-AP)) and a transport network layer that is built on a stream control transmission protocol (SCTP). The SCTP may be on top of an IP layer, and may provide the guaranteed delivery of application layer messages. In the transport IP layer, point-to-point transmission is used to deliver the signaling PDUs. In other implementations, the Xn-U protocol stack or the Xn-C protocol stack, or both, may be same or similar to the user plane and/or control plane protocol stack(s) shown and described herein.

The RAN 110 is shown to be communicatively coupled to a core network 120 (referred to as a "CN 120"). The CN 120 includes one or more network elements 122, which are configured to offer various data and telecommunications services to customers/subscribers (e.g., users of UEs 101) who are connected to the CN 120 using the RAN 110. The components of the CN 120 may be implemented in one physical node or separate physical nodes and may include components to read and execute instructions from a machine-readable or computer-readable medium (e.g., a non-transitory machine-readable storage medium). In some examples, network functions virtualization (NFV) may be used to virtualize some or all of the network node functions described here using executable instructions stored in one or more computer-readable storage mediums, as described in further detail below. A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more network components or functions, or both. Generally, an application server 130 may be an element offering applications that use IP bearer resources with the core network (e.g., UMTS packet services (PS) domain, LTE PS data services, among others). The application server 130 can also be configured to support one or more communication services (e.g., VoIP sessions, PTT sessions, group communication sessions, social networking services, among others) for the UEs 101 using the CN 120.

In some examples, the CN 120 may be a 5G core network (referred to as "5GC 120"), and the RAN 110 may be connected with the CN 120 using a next generation interface 113. In some examples, the next generation interface 113 may be split into two parts, an next generation user plane (NG-U) interface 114, which carries traffic data between the RAN nodes 111 and a user plane function (UPF), and the S1 control plane (NG-C) interface 115, which is a signaling interface between the RAN nodes 111 and access and mobility management functions (AMFs).

In some examples, the CN 120 may be an EPC (referred to as "EPC 120" or the like), and the RAN 110 may be connected with the CN 120 using an S1 interface 113. In some examples, the S1 interface 113 may be split into two parts, an S1 user plane (S1-U) interface 114, which carries traffic data between the RAN nodes 111 and the serving gateway (S-GW), and the S1-MME interface 115, which is a signaling interface between the RAN nodes 111 and mobility management entities (MMEs).

Figure 2:
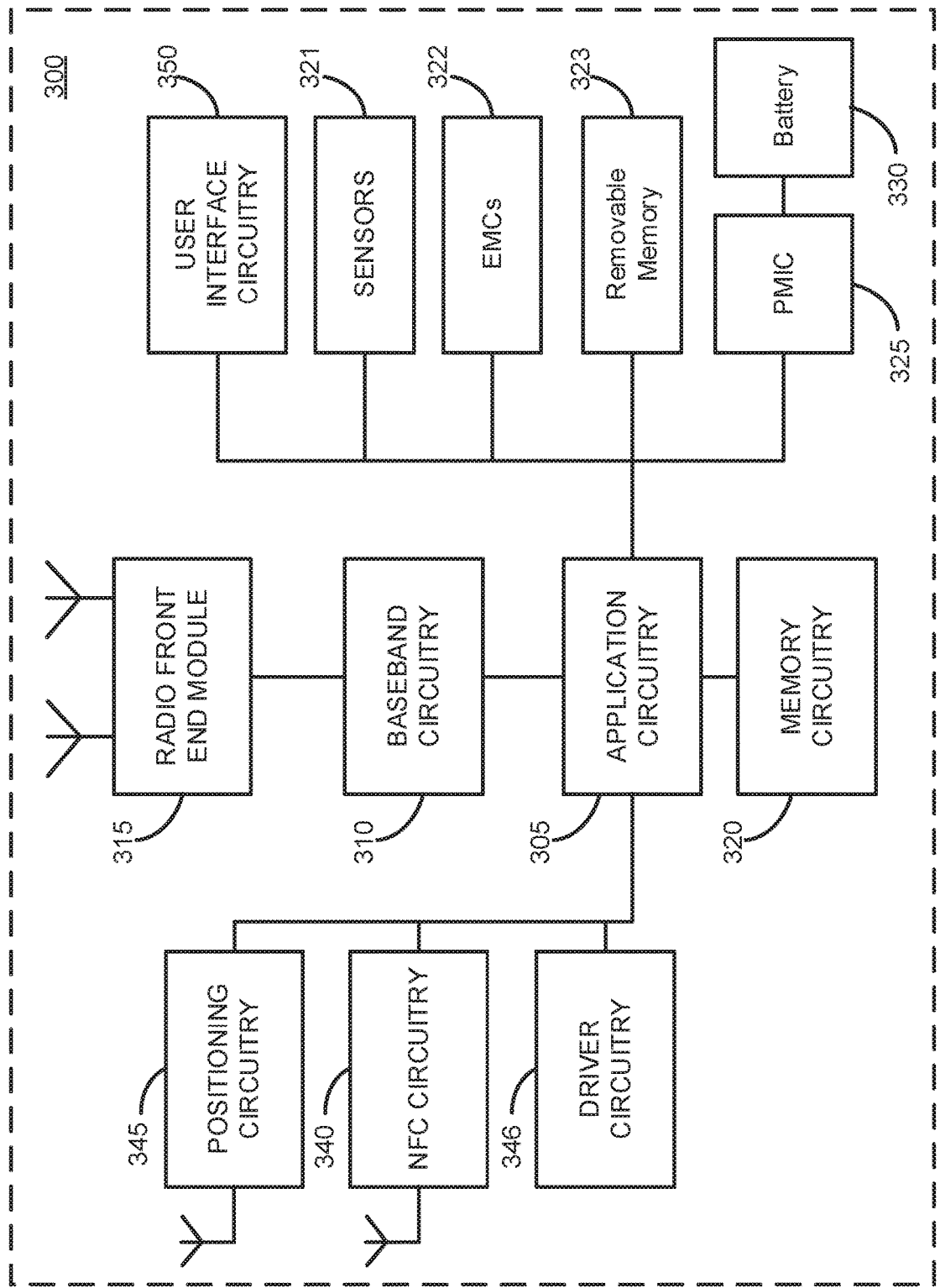
FIG. 2 illustrates an example of a platform or device, according to various embodiments herein.

FIG. 2 illustrates an example of a platform 300 (or "device 300"). In some examples, the computer platform 300 may be suitable for use as UEs 101, 201, 301, application servers 130, or any other component or device discussed herein. The platform 300 may include any combinations of the components shown in the example. The components of platform 300 (or portions thereof) may be implemented as integrated circuits (ICs), discrete electronic devices, or other modules, logic, hardware, software, firmware, or a combination of them adapted in the computer platform 300, or as components otherwise incorporated within a chassis of a larger system. The block diagram of FIG. 2 is intended to show a high level view of components of the platform 300. However, in some examples, the platform 300 may include fewer, additional, or alternative components, or a different arrangement of the components shown in FIG. 2.

The application circuitry 305 includes circuitry such as, but not limited to, one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 305 may be coupled with or may include memory/storage elements and may be configured to execute instructions stored in the memory or storage to enable various applications or operating systems to run on the system 300. In some examples, the memory or storage elements may be on-chip memory circuitry, which may include any suitable volatile or non-volatile memory, such as DRAM, SRAM, EPROM, EEPROM, Flash memory, solid-state memory, or combinations of them, among other types of memory.

The processor(s) of application circuitry 305 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some examples, the application circuitry 305 may include, or may be, a special-purpose processor/controller to carry out the techniques described herein.

As examples, the processor(s) of application circuitry 305 may include an Apple A-series processor. The processors of the application circuitry 305 may also be one or more of an Intel® Architecture Core™ based processor, such as a Quark™, an Atom™, an i3, an i5, an i7, or an MCU-class processor, or another such processor available from Intel® Corporation, Santa Clara, Calif.; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 305 may be a part of a system on a chip (SoC) in which the application circuitry 305 and other components are formed into a single integrated circuit.

Additionally or alternatively, the application circuitry 305 may include circuitry such as, but not limited to, one or more a field-programmable devices (FPDs) such as FPGAs; programmable logic devices (PLDs) such as complex PLDs (CPLDs), high-capacity PLDs (HCPLDs); ASICs such as structured ASICs; programmable SoCs (PSoCs), or combinations of them, among others. In some examples, the application circuitry 305 may include logic blocks or logic fabric, and other interconnected resources that may be programmed to perform various functions, such as the procedures, methods, functions described herein. In some examples, the application circuitry 305 may include memory cells (e.g., erasable programmable read-only memory (EPROM), electrically erasable programmable read-only memory (EEPROM), flash memory, static memory (e.g., static random access memory (SRAM), or anti-fuses)) used to store logic blocks, logic fabric, data, or other data in look-up tables (LUTs) and the like.

The baseband circuitry 310 may be implemented, for example, as a solder-down substrate including one or more integrated circuits, a single packaged integrated circuit soldered to a main circuit board or a multi-chip module containing two or more integrated circuits.

The RFEMs 315 may comprise a millimeter wave (mmWave) RFEM and one or more sub-mmWave radio frequency integrated circuits (RFICs). In some examples, the one or more sub-mmWave RFICs may be physically separated from the mmWave RFEM. The RFICs may include connections to one or more antennas or antenna arrays, and the RFEM may be connected to multiple antennas. In some examples, both mmWave and sub-mmWave radio functions may be implemented in the same physical RFEM 315, which incorporates both mmWave antennas and sub-mmWave.

The memory circuitry 320 may include any number and type of memory devices used to provide for a given amount of system memory. As examples, the memory circuitry 320 may include one or more of volatile memory, such as random access memory (RAM), dynamic RAM (DRAM) or synchronous dynamic RAM (SDRAM), and nonvolatile memory (NVM), such as high-speed electrically erasable memory (commonly referred to as Flash memory), phase change random access memory (PRAM), or magnetoresistive random access memory (MRAM), or combinations of them, among others. The memory circuitry 320 may be developed in accordance with a Joint Electron Devices Engineering Council (JEDEC) low power double data rate (LPDDR)-based design, such as LPDDR2, LPDDR3, LPDDR4, or the like. Memory circuitry 320 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, or soldered onto a motherboard using a ball grid array (BGA). In low power implementations, the memory circuitry 320 may be on-die memory or registers associated with the application circuitry 305. To provide for persistent storage of information such as data, applications, operating systems and so forth, memory circuitry 320 may include one or more mass storage devices, which may include, for example, a solid state disk drive (SSDD), hard disk drive (HDD), a micro HDD, resistance change memories, phase change memories, holographic memories, or chemical memories, among others. In some examples, the computer platform 300 may incorporate the three-dimensional (3D) cross-point (XPOINT) memories from Intel® and Micron®.

The removable memory circuitry 323 may include devices, circuitry, enclosures, housings, ports or receptacles, among others, used to couple portable data storage devices with the platform 300. These portable data storage devices may be used for mass storage purposes, and may include, for example, flash memory cards (e.g., Secure Digital (SD) cards, microSD cards, xD picture cards), and USB flash drives, optical discs, or external HDDs, or combinations of them, among others.

The platform 300 may also include interface circuitry (not shown) for connecting external devices with the platform 300. The external devices connected to the platform 300 using the interface circuitry include sensor circuitry 321 and electro-mechanical components (EMCs) 322, as well as removable memory devices coupled to removable memory circuitry 323.

The sensor circuitry 321 include devices, modules, or subsystems whose purpose is to detect events or changes in its environment and send the information (e.g., sensor data) about the detected events to one or more other devices, modules, or subsystems. Examples of such sensors include inertial measurement units (IMUS) such as accelerometers, gyroscopes, or magnetometers; microelectromechanical systems (MEMS) or nanoelectromechanical systems (NEMS) including 3-axis accelerometers, 3-axis gyroscopes, or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other audio capture devices, or combinations of them, among others.

The EMCs 322 include devices, modules, or subsystems whose purpose is to enable the platform 300 to change its state, position, or orientation, or move or control a mechanism, system, or subsystem. Additionally, the EMCs 322 may be configured to generate and send messages or signaling to other components of the platform 300 to indicate a current state of the EMCs 322. Examples of the EMCs 322 include one or more power switches, relays, such as electromechanical relays (EMRs) or solid state relays (SSRs), actuators (e.g., valve actuators), an audible sound generator, a visual warning device, motors (e.g., DC motors or stepper motors), wheels, thrusters, propellers, claws, clamps, hooks, or combinations of them, among other electro-mechanical components. In some examples, the platform 300 is configured to operate one or more EMCs 322 based on one or more captured events, instructions, or control signals received from a service provider or clients, or both.

In some examples, the interface circuitry may connect the platform 300 with positioning circuitry 345. The positioning circuitry 345 includes circuitry to receive and decode signals transmitted or broadcasted by a positioning network of a GNSS. Examples of a GNSS include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, among other systems. The positioning circuitry 345 comprises various hardware elements (e.g., including hardware devices such as switches, filters, amplifiers, antenna elements, and the like to facilitate OTA communications) to communicate with components of a positioning network, such as navigation satellite constellation nodes. In some examples, the positioning circuitry 345 may include a Micro-PNT IC that uses a master timing clock to perform position tracking or estimation without GNSS assistance. The positioning circuitry 345 may also be part of, or interact with, the baseband circuitry 410 or RFEMs 315, or both, to communicate with the nodes and components of the positioning network. The positioning circuitry 345 may also provide data (e.g., position data, time data) to the application circuitry 305, which may use the data to synchronize operations with various infrastructure (e.g., radio base stations), for turn-by-turn navigation applications, or the like.

In some examples, the interface circuitry may connect the platform 300 with Near-Field Communication (NFC) circuitry 340. The NFC circuitry 340 is configured to provide contactless, short-range communications based on radio frequency identification (RFID) standards, in which magnetic field induction is used to enable communication between NFC circuitry 340 and NFC-enabled devices external to the platform 300 (e.g., an "NFC touchpoint"). The NFC circuitry 340 includes an NFC controller coupled with an antenna element and a processor coupled with the NFC controller. The NFC controller may be a chip or IC providing NFC functionalities to the NFC circuitry 340 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 340, or initiate data transfer between the NFC circuitry 340 and another active NFC device (e.g., a smartphone or an NFC-enabled POS terminal) that is proximate to the platform 300.

The driver circuitry 346 may include software and hardware elements that operate to control particular devices that are embedded in the platform 300, attached to the platform 300, or otherwise communicatively coupled with the platform 300. The driver circuitry 346 may include individual drivers allowing other components of the platform 300 to interact with or control various input/output (I/O) devices that may be present within, or connected to, the platform 300. For example, the driver circuitry 346 may include a display driver to control and allow access to a display device, a touchscreen driver to control and allow access to a touchscreen interface of the platform 300, sensor drivers to obtain sensor readings of sensor circuitry 321 and control and allow access to sensor circuitry 321, EMC drivers to obtain actuator positions of the EMCs 322 or control and allow access to the EMCs 322, a camera driver to control and allow access to an embedded image capture device, audio drivers to control and allow access to one or more audio devices.

The power management integrated circuitry (PMIC) 325 (also referred to as "power management circuitry 325") may manage power provided to various components of the platform 300. In particular, with respect to the baseband circuitry 310, the PMIC 325 may control power-source selection, voltage scaling, battery charging, or DC-to-DC conversion. The PMIC 325 may be included when the platform 300 is capable of being powered by a battery 330, for example, when the device is included in a UE 101, 201, 301.

In some examples, the PMIC 325 may control, or otherwise be part of, various power saving mechanisms of the platform 300. For example, if the platform 300 is in an RRC_Connected state, where it is still connected to the RAN node as it expects to receive traffic shortly, then it may enter a state known as Discontinuous Reception Mode (DRX) after a period of inactivity. During this state, the platform 300 may power down for brief intervals of time and thus save power. If there is no data traffic activity for an extended period of time, then the platform 300 may transition off to an RRC_Idle state, where it disconnects from the network and does not perform operations such as channel quality feedback or handover. This can allow the platform 300 to enter a very low power state, where it periodically wakes up to listen to the network and then powers down again. In some examples, the platform 300 may not receive data in the RRC_Idle state and instead must transition back to RRC_Connected state to receive data. An additional power saving mode may allow a device to be unavailable to the network for periods longer than a paging interval (ranging from seconds to a few hours). During this time, the device may be unreachable to the network and may power down completely. Any data sent during this time may incurs a large delay and it is assumed the delay is acceptable.

A battery 330 may power the platform 300, although in some examples the platform 300 may be deployed in a fixed location, and may have a power supply coupled to an electrical grid. The battery 330 may be a lithium ion battery, a metal-air battery, such as a zinc-air battery, an aluminum-air battery, or a lithium-air battery, among others. In some examples, such as in V2X applications, the battery 330 may be a typical lead-acid automotive battery.

In some examples, the battery 330 may be a "smart battery," which includes or is coupled with a Battery Management System (BMS) or battery monitoring integrated circuitry. The BMS may be included in the platform 300 to track the state of charge (SoCh) of the battery 330. The BMS may be used to monitor other parameters of the battery 330 to provide failure predictions, such as the state of health (SoH) and the state of function (SoF) of the battery 330. The BMS may communicate the information of the battery 330 to the application circuitry 305 or other components of the platform 300. The BMS may also include an analog-to-digital (ADC) convertor that allows the application circuitry 305 to directly monitor the voltage of the battery 330 or the current flow from the battery 330. The battery parameters may be used to determine actions that the platform 300 may perform, such as transmission frequency, network operation, or sensing frequency, among others.

A power block, or other power supply coupled to an electrical grid may be coupled with the BMS to charge the battery 330. In some examples, the power block 330 may be replaced with a wireless power receiver to obtain the power wirelessly, for example, through a loop antenna in the computer platform 300. In these examples, a wireless battery charging circuit may be included in the BMS. The specific charging circuits chosen may depend on the size of the battery 330, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

The user interface circuitry 350 includes various input/output (I/O) devices present within, or connected to, the platform 300, and includes one or more user interfaces designed to enable user interaction with the platform 300 or peripheral component interfaces designed to enable peripheral component interaction with the platform 300. The user interface circuitry 350 includes input device circuitry and output device circuitry. Input device circuitry includes any physical or virtual means for accepting an input including one or more physical or virtual buttons (e.g., a reset button), a physical keyboard, keypad, mouse, touchpad, touchscreen, microphones, scanner, or headset, or combinations of them, among others. The output device circuitry includes any physical or virtual means for showing information or otherwise conveying information, such as sensor readings, actuator position(s), or other information. Output device circuitry may include any number or combinations of audio or visual display, including one or more simple visual outputs or indicators (e.g., binary status indicators (e.g., light emitting diodes (LEDs)), multi-character visual outputs, or more complex outputs such as display devices or touchscreens (e.g., Liquid Chrystal Displays (LCD), LED displays, quantum dot displays, or projectors), with the output of characters, graphics, or multimedia objects being generated or produced from the operation of the platform 300. The output device circuitry may also include speakers or other audio emitting devices, or printer(s). In some examples, the sensor circuitry 321 may be used as the input device circuitry (e.g., an image capture device or motion capture device), and one or more EMCs may be used as the output device circuitry (e.g., an actuator to provide haptic feedback). In another example, NFC circuitry comprising an NFC controller coupled with an antenna element and a processing device may be included to read electronic tags or connect with another NFC-enabled device. Peripheral component interfaces may include, but are not limited to, a non-volatile memory port, a USB port, an audio jack, or a power supply interface.

Although not shown, the components of platform 300 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus or IX may be a proprietary bus or IX, for example, used in a SoC based system. Other bus or IX systems may be included, such as an I2C interface, an SPI interface, point-to-point interfaces, and a power bus, among others.

Figure 3:
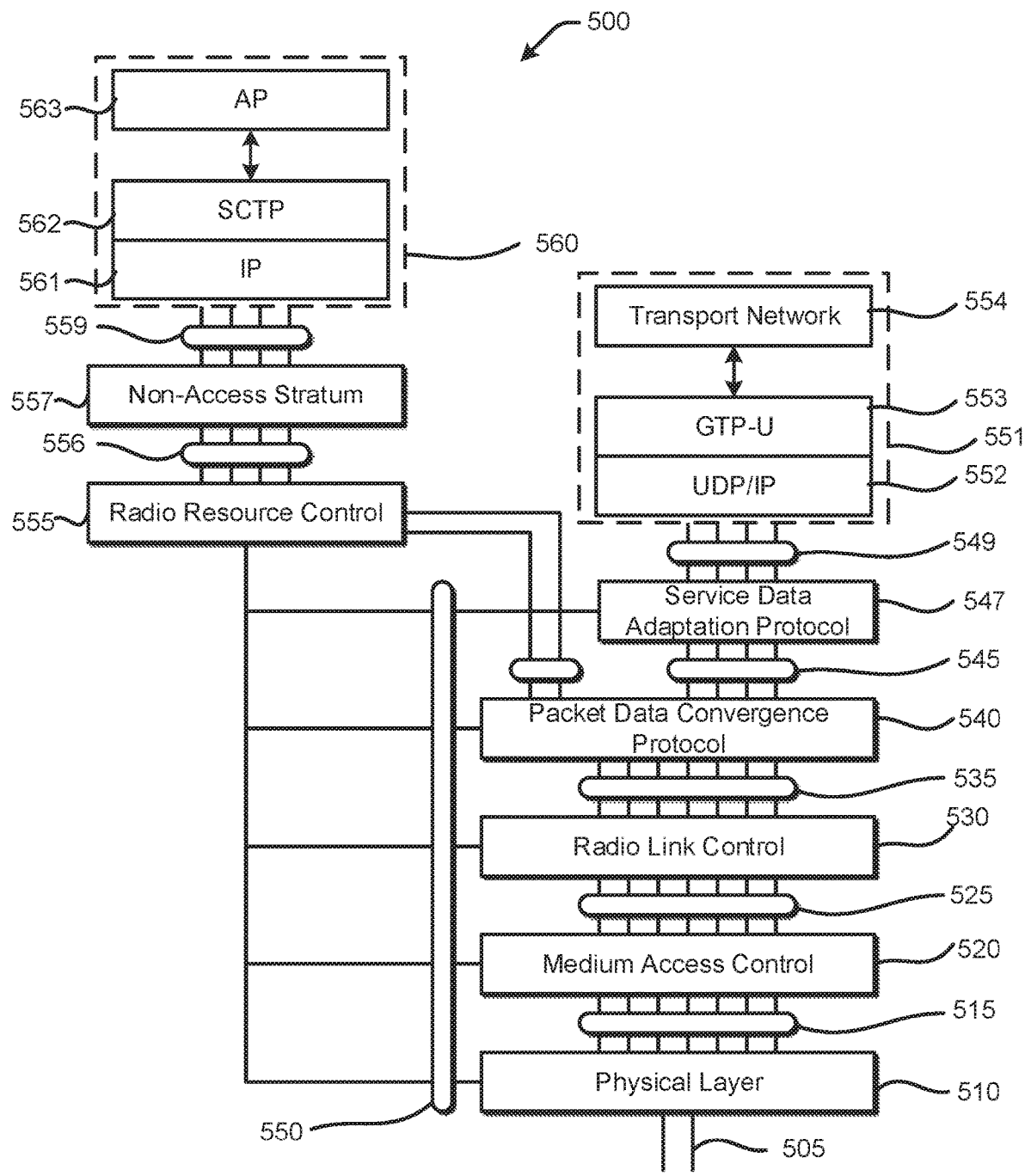
FIG. 3 illustrates example protocol functions that may be implemented in wireless communication systems, according to various embodiments herein.

FIG. 3 illustrates various protocol functions that may be implemented in a wireless communication device. In particular, FIG. 3 includes an arrangement 500 showing interconnections between various protocol layers/entities. The following description of FIG. 3 is provided for various protocol layers and entities that operate in conjunction with the 5G NR system standards and the LTE system standards, but some or all of the aspects of FIG. 3 may be applicable to other wireless communication network systems as well. The protocol layers of arrangement 500 may include one or more of PHY 510, MAC 520, RLC 530, PDCP 540, SDAP 547, RRC 555, and NAS layer 557, in addition to other higher layer functions not illustrated. The protocol layers may include one or more service access points (e.g., items 559, 556, 550, 549, 545, 535, 525, and 515 in FIG. 3) that may provide communication between two or more protocol layers.

The PHY 510 may transmit and receive physical layer signals 505 that may be received from or transmitted to one or more other communication devices. The physical layer signals 505 may include one or more physical channels, such as those discussed herein. The PHY 510 may further perform link adaptation or adaptive modulation and coding (AMC), power control, cell search (e.g., for initial synchronization and handover purposes), and other measurements used by higher layers, such as the RRC 555. The PHY 510 may still further perform error detection on the transport channels, forward error correction (FEC) coding and decoding of the transport channels, modulation and demodulation of physical channels, interleaving, rate matching, mapping onto physical channels, and MIMO antenna processing. In some examples, an instance of PHY 510 may process requests from and provide indications to an instance of MAC 520 using one or more PHY-SAP 515. In some examples, requests and indications communicated using PHY-SAP 515 may comprise one or more transport channels.

Instance(s) of MAC 520 may process requests from, and provide indications to, an instance of RLC 530 using one or more MAC-SAPs 525. These requests and indications communicated using the MAC-SAP 525 may include one or more logical channels. The MAC 520 may perform mapping between the logical channels and transport channels, multiplexing of MAC service data units (SDUs) from one or more logical channels onto transport blocks (TBs) to be delivered to PHY 510 using the transport channels, demultiplexing MAC SDUs to one or more logical channels from TBs delivered from the PHY 510 using transport channels, multiplexing MAC SDUs onto TBs, scheduling information reporting, error correction through HARQ, and logical channel prioritization. Instance(s) of RLC 530 may process requests from and provide indications to an instance of PDCP 540 using one or more radio link control service access points (RLC-SAP) 535. These requests and indications communicated using RLC-SAP 535 may include one or more RLC channels. The RLC 530 may operate in a plurality of modes of operation, including: Transparent Mode (TM), Unacknowledged Mode (UM), and Acknowledged Mode (AM). The RLC 530 may execute transfer of upper layer protocol data units (PDUs), error correction through automatic repeat request (ARQ) for AM data transfers, and concatenation, segmentation and reassembly of RLC SDUs for UM and AM data transfers. The RLC 530 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 540 may process requests from and provide indications to instance(s) of RRC 555 or instance(s) of SDAP 547, or both, using one or more packet data convergence protocol service access points (PDCP-SAP) 545. These requests and indications communicated using PDCP-SAP 545 may include one or more radio bearers. The PDCP 540 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, or integrity verification).

Instance(s) of SDAP 547 may process requests from and provide indications to one or more higher layer protocol entities using one or more SDAP-SAP 549. These requests and indications communicated using SDAP-SAP 549 may include one or more QoS flows. The SDAP 547 may map QoS flows to data radio bearers (DRBs), and vice versa, and may also mark QoS flow identifiers (QFIs) in DL and UL packets. A single SDAP entity 547 may be configured for an individual PDU session. In the UL direction, the NG-RAN 110 may control the mapping of QoS Flows to DRB(s) in two different ways, reflective mapping or explicit mapping. For reflective mapping, the SDAP 547 of a UE 101 may monitor the QFIs of the DL packets for each DRB, and may apply the same mapping for packets flowing in the UL direction. For a DRB, the SDAP 547 of the UE 101 may map the UL packets belonging to the QoS flows(s) corresponding to the QoS flow ID(s) and PDU session observed in the DL packets for that DRB. To enable reflective mapping, the NG-RAN 310 may mark DL packets over the Uu interface with a QoS flow ID. The explicit mapping may involve the RRC 555 configuring the SDAP 547 with an explicit QoS flow to DRB mapping rule, which may be stored and followed by the SDAP 547. In some examples, the SDAP 547 may only be used in NR implementations and may not be used in LTE implementations.

The RRC 555 may configure, using one or more management service access points (M-SAP), aspects of one or more protocol layers, which may include one or more instances of PHY 510, MAC 520, RLC 530, PDCP 540 and SDAP 547. In some examples, an instance of RRC 555 may process requests from and provide indications to one or more NAS entities 557 using one or more RRC-SAPs 556. The main services and functions of the RRC 555 may include broadcast of system information (e.g., included in master information blocks (MIBs) or system information blocks (SIBs) related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more information elements, which may each comprise individual data fields or data structures.

The NAS 557 may form the highest stratum of the control plane between the UE 101 and the AMF. The NAS 557 may support the mobility of the UEs 101 and the session management procedures to establish and maintain IP connectivity between the UE 101 and a P-GW in LTE systems.

In some examples, one or more protocol entities of arrangement 500 may be implemented in UEs 101, RAN nodes 111, AMF in NR implementations or MME 221 in LTE implementations, UPF 302 in NR implementations or S-GW 222 and P-GW 223 in LTE implementations, or the like to be used for control plane or user plane communications protocol stack between the aforementioned devices. In some examples, one or more protocol entities that may be implemented in one or more of UE 101, gNB 111, AMF, among others, may communicate with a respective peer protocol entity that may be implemented in or on another device using the services of respective lower layer protocol entities to perform such communication. In some examples, a gNB-CU of the gNB 111 may host the RRC 555, SDAP 547, and PDCP 540 of the gNB that controls the operation of one or more gNB-DUs, and the gNB-DUs of the gNB 111 may each host the RLC 530, MAC 520, and PHY 510 of the gNB 111.

In some examples, a control plane protocol stack may include, in order from highest layer to lowest layer, NAS 557, RRC 555, PDCP 540, RLC 530, MAC 520, and PHY 510. In this example, upper layers 560 may be built on top of the NAS 557, which includes an IP layer 561, an SCTP 562, and an application layer signaling protocol (AP) 563.

In some examples, such as NR implementations, the AP 563 may be an NG application protocol layer (NGAP or NG-AP) 563 for the NG interface 113 defined between the NG-RAN node 111 and the AMF, or the AP 563 may be an Xn application protocol layer (XnAP or Xn-AP) 563 for the Xn interface 112 that is defined between two or more RAN nodes 111.

The NG-AP 563 may support the functions of the NG interface 113 and may comprise elementary procedures (EPs). An NG-AP EP may be a unit of interaction between the NG-RAN node 111 and the AMF. The NG-AP 563 services may include two groups: UE-associated services (e.g., services related to a UE 101) and non-UE-associated services (e.g., services related to the whole NG interface instance between the NG-RAN node 111 and AMF). These services may include functions such as, but not limited to: a paging function for the sending of paging requests to NG-RAN nodes 111 involved in a particular paging area; a UE context management function for allowing the AMF to establish, modify, or release a UE context in the AMF and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF; a NAS node selection function for determining an association between the AMF and the UE 101; NG interface management function(s) for setting up the NG interface and monitoring for errors over the NG interface; a warning message transmission function for providing means to transfer warning messages using NG interface or cancel ongoing broadcast of warning messages; a configuration transfer function for requesting and transferring of RAN configuration information (e.g., SON information or performance measurement (PM) data) between two RAN nodes 111 using CN 120, or combinations of them, among others.

The XnAP 563 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN 210), such as handover preparation and cancellation procedures, SN Status Transfer procedures, UE context retrieval and UE context release procedures, RAN paging procedures, or dual connectivity related procedures, among others. The XnAP global procedures may comprise procedures that are not related to a specific UE 101, such as Xn interface setup and reset procedures, NG-RAN update procedures, or cell activation procedures, among others.

In LTE implementations, the AP 563 may be an S1 Application Protocol layer (S1-AP) 563 for the S1 interface 113 defined between an E-UTRAN node 111 and an MME, or the AP 563 may be an X2 application protocol layer (X2AP or X2-AP) 563 for the X2 interface 112 that is defined between two or more E-UTRAN nodes 111.

The S1 Application Protocol layer (S1-AP) 563 may support the functions of the S1 interface, and similar to the NG-AP discussed previously, the S1-AP may include S1-AP EPs. An S1-AP EP may be a unit of interaction between the E-UTRAN node 111 and an MME 221 within a LTE CN 120. The S1-AP 563 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 563 may support the functions of the X2 interface 112 and may include X2AP basic mobility procedures and X2AP global procedures. The X2AP basic mobility procedures may include procedures used to handle UE mobility within the E-UTRAN 120, such as handover preparation and cancellation procedures, SN Status Transfer procedures, UE context retrieval and UE context release procedures, RAN paging procedures, or dual connectivity related procedures, among others. The X2AP global procedures may comprise procedures that are not related to a specific UE 101, such as X2 interface setup and reset procedures, load indication procedures, error indication procedures, or cell activation procedures, among others.

The SCTP layer (alternatively referred to as the SCTP/IP layer) 562 may provide guaranteed delivery of application layer messages (e.g., NGAP or XnAP messages in NR implementations, or S1-AP or X2AP messages in LTE implementations). The SCTP 562 may ensure reliable delivery of signaling messages between the RAN node 111 and the AMF/MME 221 based in part on the IP protocol, supported by the IP 561. The Internet Protocol layer (IP) 561 may be used to perform packet addressing and routing functionality. In some implementations the IP layer 561 may use point-to-point transmission to deliver and convey PDUs. In this regard, the RAN node 111 may include L2 and L1 layer communication links (e.g., wired or wireless) with the MME/AMF to exchange information.

In some examples, a user plane protocol stack may include, in order from highest layer to lowest layer, SDAP 547, PDCP 540, RLC 530, MAC 520, and PHY 510. The user plane protocol stack may be used for communication between the UE 101, the RAN node 111, and UPF 302 in NR implementations or an S-GW 222 and P-GW 223 in LTE implementations. In this example, upper layers 551 may be built on top of the SDAP 547, and may include a user datagram protocol (UDP) and IP security layer (UDP/IP) 552, a General Packet Radio Service (GPRS) Tunneling Protocol for the user plane layer (GTP-U) 553, and a User Plane PDU layer (UP PDU) 563.

The transport network layer 554 (also referred to as a "transport layer") may be built on IP transport, and the GTP-U 553 may be used on top of the UDP/IP layer 552 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 553 may be used for carrying user data within the GPRS core network and between the radio access network and the core network. The user data transported can be packets in any of IPv4, IPv6, or PPP formats, for example. The UDP/IP 552 may provide checksums for data integrity, port numbers for addressing different functions at the source and destination, and encryption and authentication on the selected data flows. The RAN node 111 and the S-GW 222 may utilize an S1-U interface to exchange user plane data using a protocol stack comprising an L1 layer (e.g., PHY 510), an L2 layer (e.g., MAC 520, RLC 530, PDCP 540, and/or SDAP 547), the UDP/IP layer 552, and the GTP-U 553. The S-GW 222 and the P-GW 223 may utilize an S5/S8a interface to exchange user plane data using a protocol stack comprising an L1 layer, an L2 layer, the UDP/IP layer 552, and the GTP-U 553. As discussed previously, NAS protocols may support the mobility of the UE 101 and the session management procedures to establish and maintain IP connectivity between the UE 101 and the P-GW 223.

Moreover, although not shown by FIG. 3, an application layer may be present above the AP 563 and/or the transport network layer 554. The application layer may be a layer in which a user of the UE 101, RAN node 111, or other network element interacts with software applications being executed, for example, by application circuitry 205 or application circuitry 305, respectively. The application layer may also provide one or more interfaces for software applications to interact with communications systems of the UE 101 or RAN node 111, such as the baseband circuitry 410. In some examples, the IP layer or the application layer, or both, may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 4:
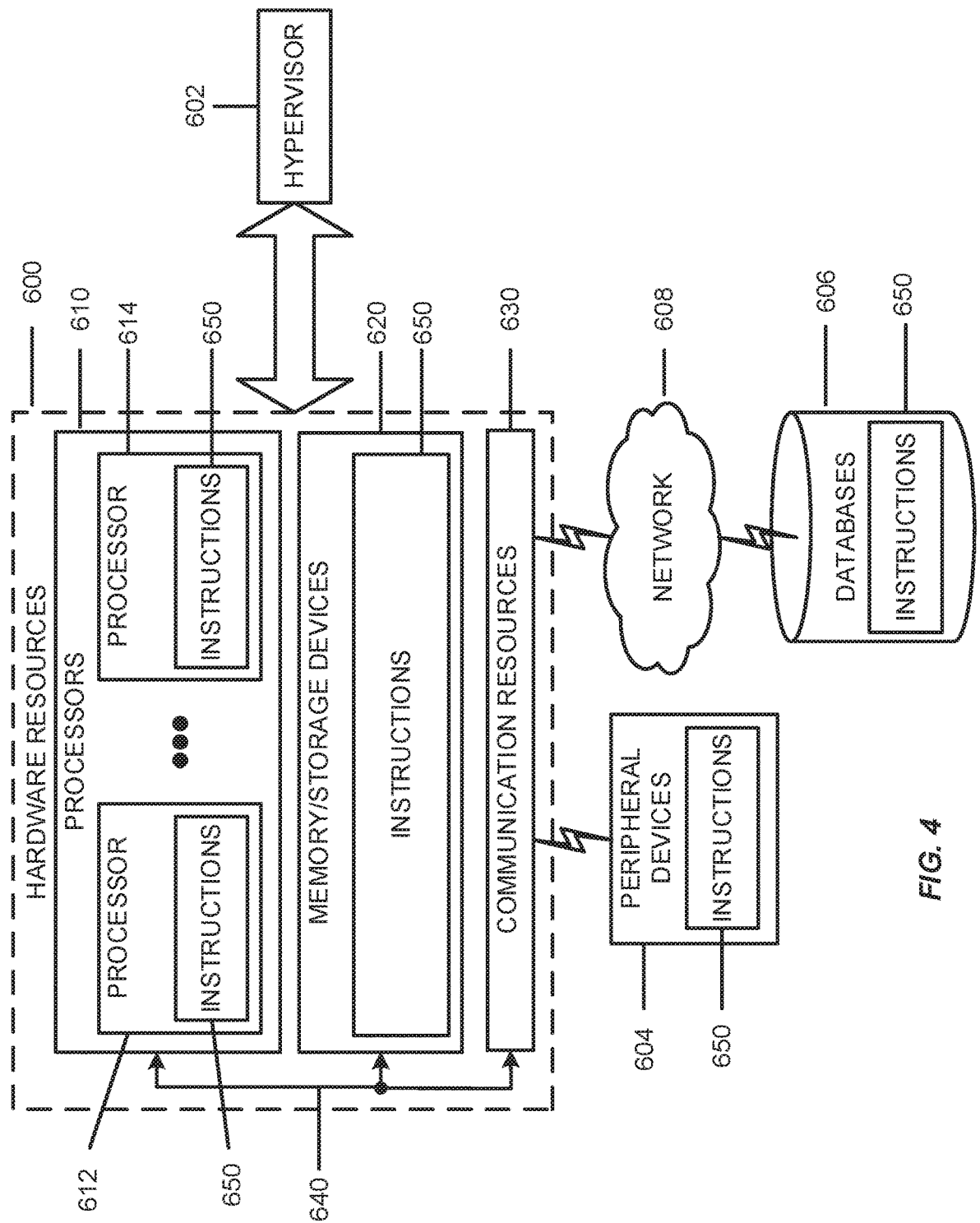
FIG. 4 illustrates an example of a computer system or a device, according to various embodiments herein.

FIG. 4 is a block diagram illustrating components for reading instructions from a machine-readable or computer-readable medium (e.g., a non-transitory machine-readable storage medium) and performing any one or more of the techniques described herein. Specifically, FIG. 4 shows a diagrammatic representation of hardware resources 600 including one or more processors (or processor cores) 610, one or more memory or storage devices 620, and one or more communication resources 630, each of which may be communicatively coupled using a bus 640. For implementations where node virtualization (e.g., NFV) is utilized, a hypervisor 602 may be executed to provide an execution environment for one or more network slices or sub-slices to utilize the hardware resources 600.

The processors 610 may include a processor 612 and a processor 614. The processor(s) 610 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 620 may include main memory, disk storage, or any suitable combination thereof. The memory/storage devices 620 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, or solid-state storage, or combinations of them, among others.

The communication resources 630 may include interconnection or network interface components or other suitable devices to communicate with one or more peripheral devices 604 or one or more databases 606 using a network 608. For example, the communication resources 630 may include wired communication components (e.g., for coupling using USB), cellular communication components, NFC components, Bluetooth® (or Bluetooth® Low Energy) components, Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

Figure 5:
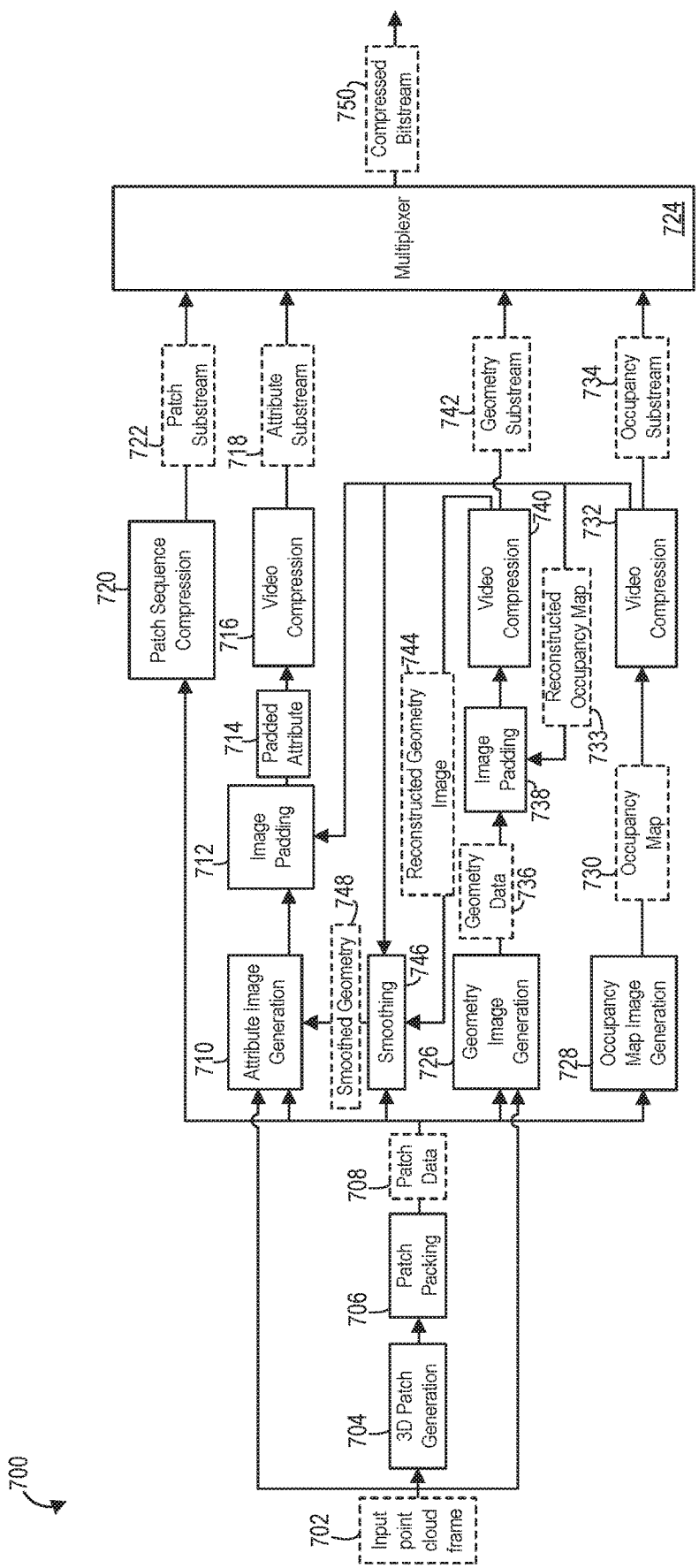
FIG. 5 illustrates an example of a video-based point cloud coding (V-PCC) architecture, according to various embodiments herein.

FIG. 5 illustrates an example of a video-based point cloud coding (V-PCC) architecture 700. The V-PCC architecture can be used with legacy video codecs such as H.264/AVC and H.265/HEVC. The architecture 700 includes a series of modules for processing a point cloud frame 702 as an input and generating a compressed bitstream 750 representing the volumetric video data as an output. The operation of the V-PCC architecture 700 are subsequently described in detail. Generally, 3D geometry and attribute data of the point cloud are transformed into a set of 2D patches. The set of 2D patches are then packed into images. The images are compressed, such as with any existing or future image or video codec. For example, the video codec can include MPEG-4 advanced video coding (AVC), high-efficiency video coding (HEVC), AV1, and so forth.

The V-PCC architecture 700 is configured to receive an input point cloud frame 702 and generate patch data 708 through a patch data generation process subsequently described in further detail. The patch data 708 are sent to a plurality of modules that process the patch data (and other data) to generate respective substreams including a patch substream 722, an attribute substream 718, a geometry substream 742, and an occupancy substream 734. The substreams 722, 718, 742, and 734 are multiplexed by a multiplexer 724 to generate the compressed bitstream 750 including all the data for streaming the volumetric video. The generation of each of the substreams 722, 718, 742, and 734 can be referred to a as a sub stream generation process. Generally, the modules of architecture 700 for generating each of the substreams 722, 718, 742, and 734 act in parallel, so that the substreams are generated in parallel processes. However, in some circumstances, modules of different processes send and receive data to each other, and the processes are partially serial, as subsequently described.

The V-PCC architecture exploits the patch-based approach to segment the point cloud into a set of clusters (or patches). The input cloud frame 702 data are used to generate 3D patches by a 3D patch generation module 704. Generally, the patches are mapped to a predefined set of 2D planes through orthogonal projections, without self-occlusions and with limited distortion. The V-PCC architecture is configured to generate temporally coherent, low-distortion, injective mapping. The mapping is used to assign each point of the 3D point cloud to a cell of the 2D grid. A mapping between the point cloud and a regular 2D grid is then obtained by packing the projected patches in the patch-packing process by a patch packing module 706. The patch packing module 706 generates patch data 708, which is sent to each substream generation process for generating substreams 722, 718, 742, and 734.

The patch-packing process is constrained to guarantee no overlapping between patches. Furthermore, the bounding box of any patch, expressed in terms of T×T blocks, where T is the packing block size, should not overlap with any T×T block belonging to a previously encoded patch. Such constraints make it possible to determine, for each T×T block of the packing grid, the patch to which it belongs by analyzing the 2D bounding boxes of all patches.

The T×T blocks are then processed in parallel to generate the point-cloud geometry and attributes. For each cell of a T×T block, the corresponding pixel in the occupancy map is used to determine whether the cell is full or empty. If the cell is full, a 3D point is generated following two different procedures, depending on the type of the patch.

V-PCC supports the concept of regular patches, which use the patch projection process previously described. For regular patches, the 3D point Cartesian coordinates are computed by combining the depth information stored in the geometry image with the 2D location of the cell, the 3D offset of the patch, and the 2D projection plane. The attribute values associated with the reconstructed points are obtained by sampling the 2D attribute frames at the same grid location.

The patch data 708 are used by four processes for generating the compressed bitstream 750. The first process described is the patch substream process. Patch data 708 that are generated to reconstruct the 3D point cloud from the 2D geometry, attribute, and occupancy videos is compressed. The patch data 708 is encoded in the V-PCC patch sequence substream, such as by a patch sequence compression module 720. The V-PCC architecture 700 introduces a codec specifically optimized to handle the patch substream 722, which occupies a relatively small amount of the overall bitstream (e.g., lower than 5%). The patch substream 722 is sent to a multiplexer 724 for combination with the attribute substream 718, the geometry substream 742, and the occupancy substream 734.

The second process described is the occupancy map generation process. The patch data 708 are sent to an occupancy map image generation module 728. The module 728 generates an occupancy map 730 indicative of which voxels are occupied. The occupancy map 730 is processed by a video compression module 732 to generate the occupancy substream 734. The substream 734 includes a stream of data indicating the occupancy information for the compressed bitstream 750. During the reconstruction process (subsequently described), the video compression module 732 generates a reconstructed occupancy map 733 which is used for image padding in the attribute subprocess and the geometry subprocess.

The third process is the geometry subprocess, in which the geometry data for the frame (e.g., for the patches) are determined and the geometry substream 742 is generated. The patch data 708 are sent to the geometry image generation module 726 for generating the geometry data 736. After image padding 738, which can use data from the reconstructed occupancy map 733 during the reconstruction process, the geometry data 736 are compressed by a video compression module 740 (which may be a specialized codec for the geometry data). The video compression module 740 generates a geometry substream 742 that is associated with the corresponding patch sequence of the patch sub stream 722 and the occupancy map 730 data of the occupancy substream 734.

The fourth process is the attribute process, in which attribute values are determined for attributes associated with the patch sequence and the geometry and occupancy data. An attribute image generation module 710 receives the patch data 708, and during reconstruction, smoothed geometry data 748 from a smoothing module 746. The smoothing module 746 in turn receives the reconstructed geometry image 744, the reconstructed occupancy map 733, and the patch data 708 to generate the smoothing geometry data 748.

The attribute image generation module 710 sends attribute data to an image padding module 712, which can receive the occupancy map 730 during reconstruction processes. The padded attribute data 714 are sent to a video compression module 716, which can be similar to or the same as video compression modules 732 and/or 740 (e.g., using a shared codec), or which can be entirely unique from the modules 732 and 740. The compression module 716 generates the attribute substream 718 for including the attribute values for the associated patch sequence data of the patch substream 722, the geometry data of the geometry sub stream 742, and the occupancy map data 730 of the occupancy sub stream 734.

Generally, additional information is used to synchronize and link the video and patch substreams is also signaled in the bitstream 750, such as synchronization data. The V-PCC bitstream 750 is then formed by concatenating the various encoded information (e.g., occupancy map substream 734, geometry substream 742, attribute substream 718, and the patch sequence substream 722) into a single stream 750. This is done by encapsulating these substreams into V-PCC data units, each consisting of a header and a payload.

The V-PCC unit header describes the V-PCC unit type. Generally, five different unit types are supported. The sequence parameter set (SPS) unit type describes the entire V-PCC bitstream and its subcomponents. The remaining unit types include the occupancy-video, geometry-video, attribute-video, and patch-sequence data units, which encapsulate the occupancy map, geometry, attribute, and patch sequence sub streams, respectively.

The V-PCC decoding process is split into two phases, including a bitstream decoding process and a reconstruction process. The bitstream decoding process takes as input the V-PCC compressed bitstream 750 and outputs the decoded occupancy, geometry, and attribute 2D video frames, together with the patch information associated with every frame. The reconstruction process uses the patch information to convert the 2D video frames into a set of reconstructed 3D point-cloud frames. The reconstruction process requires the occupancy, geometry, and attribute video sequences to be resampled at the nominal 2D resolution specified in the SPS. The resampled videos are then used for the 3D reconstruction process, which includes the geometry and attribute reconstruction and the geometry and attribute smoothing.

For A V-PCC based bitstream, an RTP-based streaming framework includes the following features. The framework includes dedicated codec bitstreams (e.g., HEVC bitstreams). The dedicated bitstreams each carry the encoded information of one of the substreams 722, 718, 742, or 734, including occupancy map data 730, geometry data 736, and attribute data 718. A dedicated RTP stream includes each codec/HEVC bitstream, such that there is a dedicated RTP stream for occupancy map, geometry and attribute information. The dedicate RTP stream uses a particular RTP payload format for that codec (e.g., an RTP payload format for HEVC). As previously described, the dedicated RTP streams 722, 718, 742, and 734 are multiplexed into a single RTP stream 750 for the V-PCC video. An RTP header extension for the multiplexed RTP stream can carry the sequence parameter set (SPS) unit type information. In some implementations, the SPS data is a part of one of the codec bitstreams or a separate bitstream, such as an SEI message for a HEVC bitstream. In another embodiment, each of the dedicated RTP streams is negotiated and transported separately as distinct media types. For example, a first media type is used for geometry data, a second media type is used for attribute data, a third media type for occupancy map data, and so forth. Additionally, another RTP stream may carry the compressed patch sequence sub-stream 722 and can be also be multiplexed into the single RTP stream for V-PCC video. Alternatively, this information may be carried as part of an RTP header extension as part of the multiplexed RTP stream. In an embodiment, HEVC SEI messages for each of the dedicated HEVC bitstreams may carry additional metadata on each encoded information, including occupancy map data 730, geometry data 736 and attribute data 714.

Figure 6:
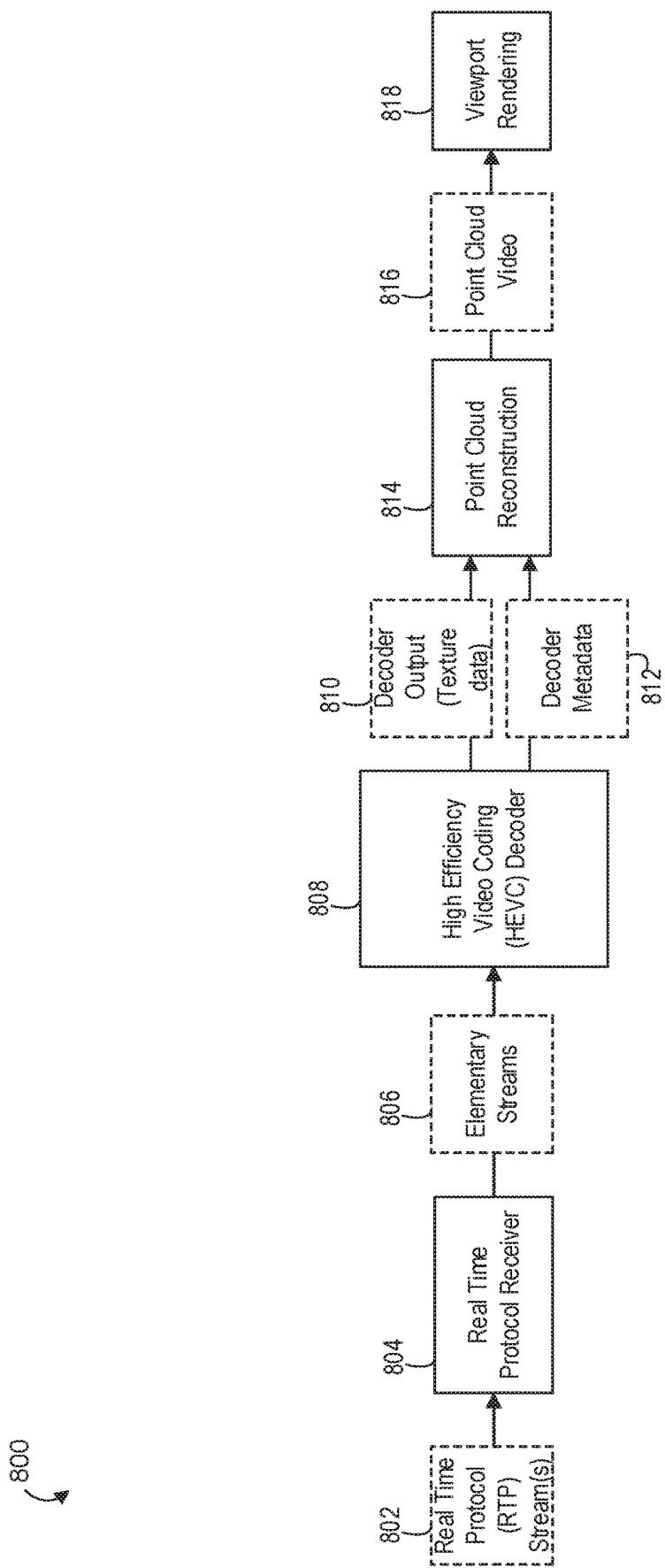
FIG. 6 illustrates an example of an overview of a possible receiver architecture, according to various embodiments herein.

FIG. 6 illustrates an example of an overview of a receiver architecture 800. The receiver architecture 800 is configured to reconstruct a spherical video from a received RTP stream that is obtained after de-multiplexing the RTP stream containing the V-PCC bitstream (e.g., bitstream 750 of FIG. 5). The architecture 800 represents a set of logical receiver functions, including a real time protocol (RTP) receiver 804, an HEVC decoder 808, a point cloud reconstruction module 814, and a viewport rendering module 818.

Based on one or more received RTP media streams, a device (e.g. a UE 101 or other network device described in relation to FIGS. 1-4) is configured to receive (at receiver 804), and parse, decrypt, and/or feed the elementary RTP stream 806 to the HEVC decoder 808. The HEVC decoder 808 obtains the decoder output signal, referred to as the texture data 810, as well as the decoder metadata 812. Texture data 810 in this context can include the occupancy map, geometry data and attribute data, depending on the HEVC bitstream. The decoder metadata 812 includes the SEI messages, such as information carried in the V-PCC specific SEI messages, to be used in the rendering phase. In particular, the decoder metadata 812 as well as the decoded texture information on the occupancy map, geometry and attribute can be used by the point cloud reconstruction function 814 to generate a point cloud (or part thereof) based on the decoded output signal (e.g., the texture data 810). The viewport data are then generated from the point cloud signal 816 (or part thereof) and rendered (e.g., by rendering module 818) by taking into account the viewport position information from sensors, display characteristics as well as possibly other metadata such as initial viewport information. These sensors can include any positioning sensors or other sensors such as gyroscopes, magnetic trackers, and so forth.

Viewport-dependent processing could be supported for both point-to-point conversational sessions and multiparty conferencing scenarios and be achieved by sending from the receiver RTCP feedback or RTP header extension messages with the desired viewport information and then encoding and sending the corresponding viewport by the multimedia telephony services over IP multimedia core network subsystems (IMS) (MTSI) sender or by the media gateway, e.g., MRF. This is expected to deliver resolutions higher than the viewport independent approach for the desired viewport. The transmitted RTP stream from the sender may also include the actual viewport or coverage information, such as in an RTP header extension message, as the point cloud video generated, encoded and streamed by the sender may cover a larger area than the desired viewport.

For negotiation of RTP streams for carrying the V-PCC bitstream, procedures specified in IETF RFC 7798 the RTP payload format for HEVC, published in March 2016 and incorporated herein in entirety, on can be reused. Further SDP attributes may also be defined instead as follows. Based on the above, an SDP framework for immersive video exchange needs to be developed to negotiate codec support, SEI messages for decoder rendering metadata, as well as RTP/RTCP signaling necessary for viewport dependent processing. These capabilities may be individually negotiated, but to simplify the SDP exchange and avoid fragmentation of capabilities it would be more preferable to specify one or more MTSI client profiles and develop the SDP framework based on these profiles.

The encoding and decoding architectures 700, 800 of FIGS. 5-6 can be performed by the devices of FIGS. 1-4 described previously. For example, the encoding and decoding architectures 700 and 800 can be implemented on a UE, an access node (AN), a networked device, a next generation node (gNB), and so forth.

Figure 7:
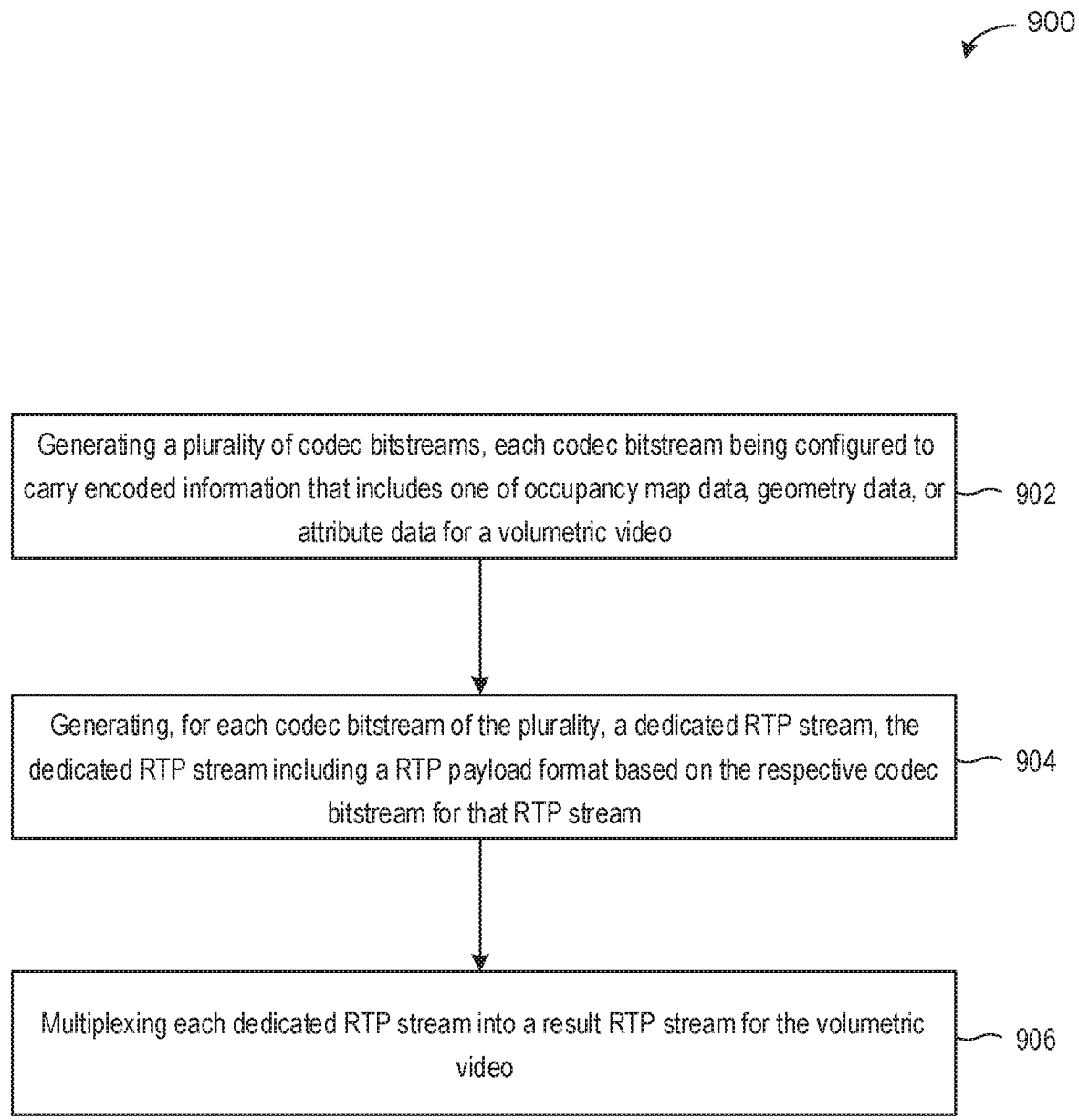
FIGS. 7 and 8 show example processes for streaming of volumetric point cloud content based on session description protocols and real time protocols, according to various embodiments herein.
Figure 8:
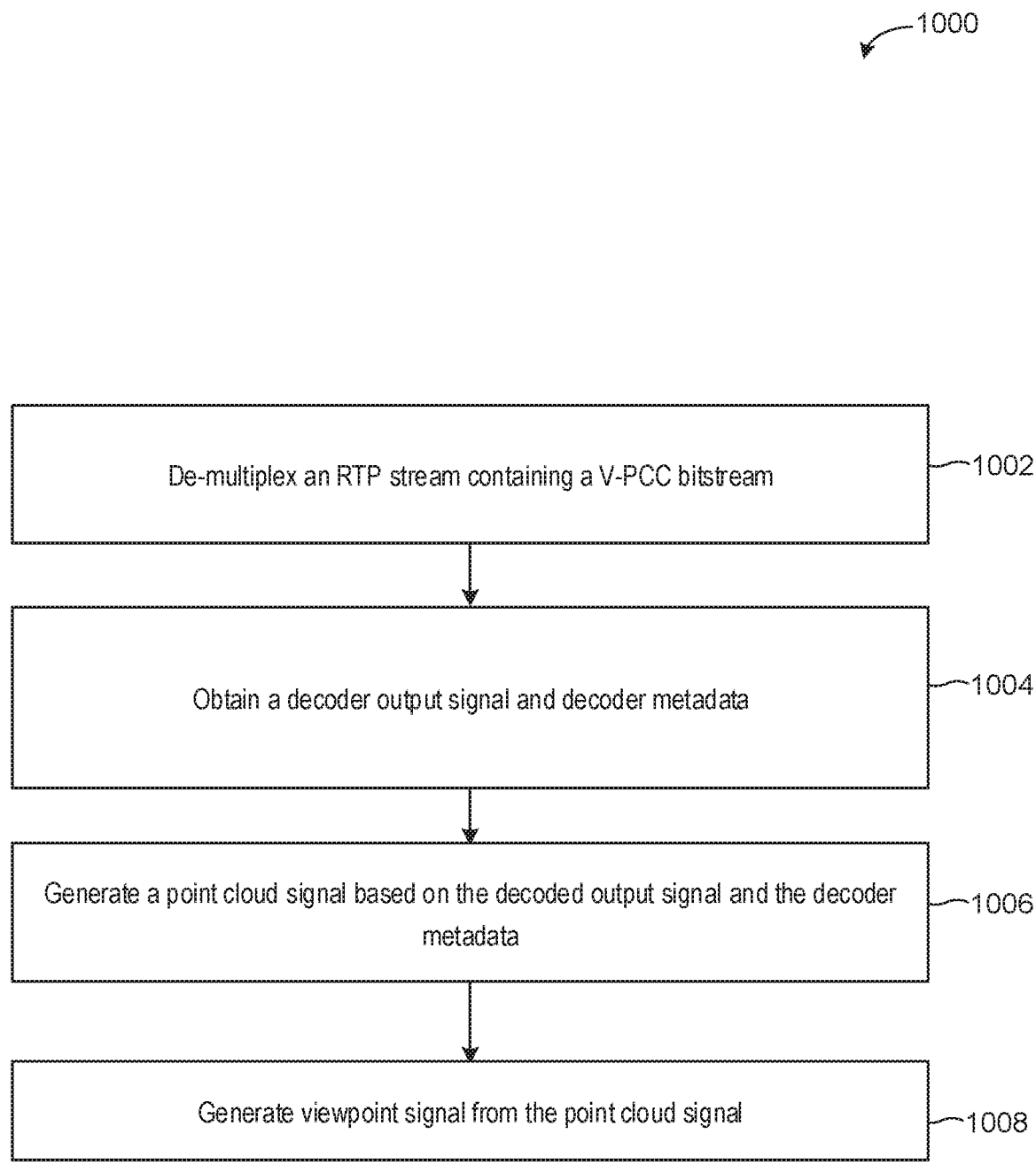

FIGS. 7 and 8 show example processes 900 and 1000 for streaming of volumetric point cloud content based on session description protocols and real time protocols, according to various embodiments herein. In some embodiments, the electronic device(s), network(s), system(s), chip(s) or component(s), or portions or implementations thereof, of FIGS. 1-6, or some other figure, may be configured to perform one or more processes, techniques, or methods as described herein, or portions thereof. One such process 900 is depicted in FIG. 7. The process 900 may be performed by a network element, a UE, or base station. For a specific embodiment, the process is performed by a network element (e.g., a gNB, access node (AN), etc.).

The process 900 shown in FIG. 7, includes generating (902) a plurality of codec bitstreams, each codec bitstream being configured to carry encoded information that includes one of occupancy map data, geometry data, or attribute data for a volumetric video. The process includes generating (904), for each codec bitstream of the plurality, a dedicated RTP stream, the dedicated RTP stream including a RTP payload format based on the respective codec bitstream for that RTP stream. The process includes multiplexing (906) each dedicated RTP stream into a result RTP stream for the volumetric video.

In some implementations, the process 900 includes performing video-based point cloud coding (V-PCC) using the result RTP stream. In some embodiments, each codec bitstream includes a high efficiency video coding (HEVC) bitstream. In some embodiments, the process 900 includes generating an additional dedicated RTP stream including a compressed patch sequence sub-stream. The process 900 includes multiplexing the additional RTP stream into the result RTP stream for V-PCC video.

In some embodiments, the process 900 includes generating an RTP header extension of the result RTP stream, the RTP header extension configured to include a compressed patch sequence substream. In some embodiments, the process 900 includes generating one or more session description protocol (SDP) attributes to indicate capabilities for carriage of point cloud video as part of the result RTP stream. In some implementations, the one or more SDP attributes for the result RTP stream indicate at least one of: an ability to carry encoded point cloud information on occupancy map data, geometry data, attribute data and patch sequence data in dedicated RTP streams; an ability to carry the dedicated RTP streams on point cloud information such as occupancy map data, geometry data, attribute data, and patch sequence data in a single multiplexed RTP stream; an ability to carry a sequence parameter set (SPS) unit type information in an RTP header extension; an ability to carry point cloud metadata information as part of the RTP payload format; and an ability to support codec capabilities to satisfy a minimum quality requirement for point cloud video.

In some embodiments, the RTP payload format comprises at least one supplemental information enhancement (SEI) message, wherein data carried in a point cloud video specific SEI message are used in a rendering phase at a receiver. In some implementations, the one or more SDP attributes indicate at least one of: an ability to signal a desired viewport using an RTCP feedback message; and an ability to signal an actually transmitted viewport using an RTP header extension message. In some embodiments, each dedicated RTP stream includes a distinct media type.

FIG. 8 shows a process 1000 for receiving a RTP bitstream and generating volumetric video from the RTP bitstream. The process 1000 includes de-multiplexing (1002) an RTP stream containing a V-PCC bitstream. The process (1004) includes obtaining a decoder output signal and decoder metadata. The process 1000 includes generating (1006) a point cloud signal based on the decoded output signal and the decoder metadata. The process 1000 includes generating (1008) viewpoint signal from the point cloud signal.

The techniques described herein can be performed by an apparatus that is implemented in or employed by one or more types of network components, user devices, or both. In some implementations, one or more non-transitory computer-readable media comprising instructions to cause an electronic device, upon execution of the instructions by one or more processors of the electronic device, to perform one or more of the described techniques. An apparatus can include one or more processors and one or more computer-readable media comprising instructions that, when executed by the one or more processors, cause the one or more processors to perform one or more of the described techniques.

The methods described here may be implemented in software, hardware, or a combination thereof, in different implementations. In addition, the order of the blocks of the methods may be changed, and various elements may be added, reordered, combined, omitted, modified, and the like. Various modifications and changes may be made as would be obvious to a person skilled in the art having the benefit of this disclosure. The various implementations described here are meant to be illustrative and not limiting. Many variations, modifications, additions, and improvements are possible. Accordingly, plural instances may be provided for components described here as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component.

The methods described herein can be implemented in circuitry such as one or more of: integrated circuit, logic circuit, a processor (shared, dedicated, or group) and/or memory (shared, dedicated, or group), an ASIC, a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), or some combination thereof. Examples of processors can include Apple A-series processors, Intel® Architecture Core™ processors, ARM processors, AMD processors, and Qualcomm processors. Other types of processors are possible. In some implementations, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry. Circuitry can also include radio circuitry such as a transmitter, receiver, or a transceiver.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/DC.

The term "Special Cell" refers to the PCell of the MCG or the PSCell of the SCG for DC operation; otherwise, the term "Special Cell" refers to the PCell.

A number of implementations have been described. Nevertheless, it will be understood that various modifications may be made. Elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

EXAMPLES

Example 1 may include an RTP streaming framework with one or more of the following. The RTP streaming framework can include dedicated codec bitstreams (e.g., HEVC bitstreams) carry each of the encoded information, e.g., occupancy map, geometry, and attribute. The RTP streaming framework can include a dedicated RTP stream that contains each codec/HEVC bitstream such that there would be a dedicated RTP stream for occupancy map, geometry and attribute information.

Example 2 may include the RTP streaming framework of Example 1 or some other example herein, where each dedicated RTP stream uses the specific RTP payload format for the respective codec (e.g., RTP payload format for HEVC). The dedicated RTP streams are multiplexed into a single RTP stream for the V-PCC video. An RTP header extension for the multiplexed RTP stream is configured to carry the sequence parameter set (SPS) unit type information. The SPS could otherwise be a part of one of the codec bitstreams, such as an SEI message for HEVC bitstream.

Example 3 may include the RTP streaming framework of example 2 or another example herein, where each of the dedicated RTP streams are negotiated and transported separately as distinct media types, such as a media type for geometry, a media type for attribute, a media type for occupancy map, and so forth.

Example 4 may include the RTP streaming framework of example 3 or another example herein, where another RTP stream can be configured to carry the compressed patch sequence sub-stream and also be multiplexed into the single RTP stream for V-PCC video.

Example 5 may include the RTP streaming framework of example 4 or another example herein, where the compressed patch sequence sub-stream may be carried as part of an RTP header extension as part of the multiplexed RTP stream.

Example 6 may include the RTP streaming framework of example 5 or another example herein, where the HEVC SEI messages for each of the dedicated HEVC bitstreams carry additional metadata on each encoded information, such as an occupancy map, geometry and an attribute.

Example 7 may include one or more SDP attributes to indicate capabilities for carriage of point cloud video as part of an RTP stream as per example 1, including (but not limited to) one or more of the following: an ability to carry encoded point cloud information on occupancy map, geometry, attribute and patch sequence in dedicated RTP streams, with the corresponding codec payload format (e.g., HEVC payload format), and possibly with distinct media types (e.g., media type for geometry); an ability to carry the dedicated RTP streams on point cloud information such as occupancy map, geometry, attribute and patch sequence in a single multiplexed RTP stream; an ability to carry the sequence parameter set (SPS) unit type information in an RTP header extension; an ability to carry point cloud metadata information as part of the RTP payload format, e.g., using Supplemental Information Enhancement (SEI) messages, such as information carried in the point cloud video specific SEI messages are then to be used in the rendering phase at the receiver; an ability to support advanced codec capabilities required to provide high enough quality for point cloud video such as HEVC Main 10 Profile, Main Tier, Level 5.1.

Example 8 may include new SDP attribute to indicate viewport-dependent processing capabilities for carriage of point cloud video as part of an RTP stream including one or more of the following: an ability to signal desired viewport using an RTCP feedback message, as described in detail in PCT/US2017/020041, filed Feb. 28, 2017 and entitled "REGION OF INTEREST SIGNALING FOR STREAMING THREE-DIMENSIONAL VIDEO INFORMATION," (hereinafter "PCT/US2017/020041"), which is hereby incorporated by reference in its entirety; and an ability to signal the actually transmitted viewport using an RTP header extension message, as described in detail in PCT/US2017/020041.

Example 9 may include SDP attribute of example 7 or some other example herein, where as a result two or more RTP streams may be negotiated.

Example 10 may include single SDP attribute that combines the capabilities in examples 7 and 8 or some other example herein.

Example 11 may include SDP attribute of example 8 or some other example herein, where one RTP stream is for the base point cloud video and another is a viewport-optimized optimized RTP stream, with the high quality point cloud video corresponding to the desired viewport.

Example 12 may include a method of RTP streaming, the method comprising: generating dedicated codec bitstreams (e.g., HEVC bitstreams) to carry encoded information that includes, e.g., occupancy map, geometry, and attribute; generating a dedicated RTP stream that includes codec/HEVC bitstream, e.g., a dedicated RTP stream for occupancy map, geometry and attribute information, the dedicated RTP stream to use a specific RTP payload format for that codec (e.g., RTP payload format for HEVC); and multiplexing the dedicated RTP streams into a single RTP stream for a V-PCC video.

Example 13 may include the method of example 12 or some other example herein, further comprising: generating another RTP stream to carry a compressed patch sequence sub-stream; and multiplexing another RTP stream into the single RTP stream for V-PCC video.

Example 14 may include the method of example 12 or some other example herein, further comprising: generating an RTP header extension of the multiplexed RTP stream to carry a compressed patch sequence sub-stream.

Example 15 may include a method comprising: generating one or more SDP attributes to indicate capabilities for carriage of point cloud video as part of an RTP stream.

Example 16 may include the method of example 15 or some other example herein, wherein the one or more SDP attributes indicate: an ability to carry encoded point cloud information on occupancy map, geometry, attribute and patch sequence in dedicated RTP streams, with the corresponding codec payload format (e.g., HEVC payload format), and optionally with distinct media types (e.g., media type for geometry); an ability to carry the dedicated RTP streams on point cloud information such as occupancy map, geometry, attribute and patch sequence in a single multiplexed RTP stream; an ability to carry the sequence parameter set (SPS) unit type information in an RTP header extension; an ability to carry point cloud metadata information as part of the RTP payload format, such as using Supplemental Information Enhancement (SEI) messages, wherein information carried in the point cloud video specific SEI messages are used in the rendering phase at the receiver; or an ability to support advanced codec capabilities required to provide high enough quality for point cloud video such as HEVC Main 10 Profile, Main Tier, Level 5.1.

Example 17 may include a method comprising generating an SDP attribute to indicate viewport-dependent processing capabilities for carriage of point cloud video as part of an RTP stream.

Example 18 may include the method of example 17 or some other example herein, wherein the SDP attribute is to indicate: an ability to signal desired viewport using an RTCP feedback message, as described in detail in P112382PCT; or an ability to signal the actually transmitted viewport using an RTP header extension message, as described in P112382PCT.

Example 19 may include an apparatus comprising means to perform one or more elements of a method described in or related to any of examples 1-18, or any other method or process described herein.

Example 20 may include one or more non-transitory computer-readable media comprising instructions to cause an electronic device, upon execution of the instructions by one or more processors of the electronic device, to perform one or more elements of a method described in or related to any of examples 1-18, or any other method or process described herein.

Example 21 may include an apparatus comprising logic, modules, or circuitry to perform one or more elements of a method described in or related to any of examples 1-18, or any other method or process described herein.

Example 22 may include a method, technique, or process as described in or related to any of examples 1-18, or portions or parts thereof.

Example 23 may include an apparatus comprising: one or more processors and one or more computer-readable media comprising instructions that, when executed by the one or more processors, cause the one or more processors to perform the method, techniques, or process as described in or related to any of examples 1-18, or portions thereof.

Example 24 may include a signal as described in or related to any of examples 1-18, or portions or parts thereof.

Example 25 may include a datagram, packet, frame, segment, protocol data unit (PDU), or message as described in or related to any of examples 1-18, or portions or parts thereof, or otherwise described in the present disclosure.

Example 26 may include a signal encoded with data as described in or related to any of examples 1-18, or portions or parts thereof, or otherwise described in the present disclosure.

Example 27 may include a signal encoded with a datagram, packet, frame, segment, protocol data unit (PDU), or message as described in or related to any of examples 1-18, or portions or parts thereof, or otherwise described in the present disclosure.

Example 28 may include an electromagnetic signal carrying computer-readable instructions, wherein execution of the computer-readable instructions by one or more processors is to cause the one or more processors to perform the method, techniques, or process as described in or related to any of examples 1-18, or portions thereof.

Example 29 may include a computer program comprising instructions, wherein execution of the program by a processing element is to cause the processing element to carry out the method, techniques, or process as described in or related to any of examples 1-18, or portions thereof.

Example 30 may include a signal in a wireless network as shown and described herein.

Example 31 may include a method of communicating in a wireless network as shown and described herein.

Example 32 may include a system for providing wireless communication as shown and described herein.

Example 33 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A method for real time protocol (RTP) data streaming, the method comprising:
   receiving, from a receiver in a RTP extension message, data indicative of a viewport that is associated with the receiver;
   generating, based on the data indicative of the viewport, a plurality of codec bitstreams, each codec bitstream being configured to include encoded information that includes one of occupancy map data, geometry data, or attribute data for a volumetric video;
   generating, for each codec bitstream of the plurality of codec bitstreams, a dedicated RTP stream, the dedicated RTP stream including a RTP payload format based on the respective codec bitstream for that RTP stream;
   multiplexing each dedicated RTP stream into a result RTP stream for the volumetric video;
   generating one or more session description protocol (SDP) attributes to indicate capabilities for carriage of point cloud video as part of the result RTP stream, the one or more SDP attributes for the result RTP stream indicating an ability to carry point cloud metadata information as part of the RTP payload format; and
   sending, to the receiver, the one or more SDP attributes and the result RTP stream that includes data representing the viewport of the volumetric video in the result RTP stream.

2. The method of claim 1, further comprising:
   performing video-based point cloud coding (V-PCC) using the result RTP stream.

3. The method of claim 1, wherein each codec bitstream includes a high efficiency video coding (HEVC) bitstream.

4. The method of claim 1, further comprising:
   generating an additional dedicated RTP stream including a compressed patch sequence sub-stream; and
   multiplexing the additional RTP stream into the result RTP stream for V-PCC video.

5. The method of claim 1, further comprising:
   generating an RTP header extension of the result RTP stream, the RTP header extension configured to include a compressed patch sequence substream.

6. The method of claim 1, wherein the one or more SDP attributes for the result RTP stream indicate each of:
   an ability to carry encoded point cloud information on occupancy map data, geometry data, attribute data and patch sequence data in dedicated RTP streams;
   an ability to carry the dedicated RTP streams on point cloud information such as occupancy map data, geometry data, attribute data, and patch sequence data in a single multiplexed RTP stream;
   an ability to carry a sequence parameter set (SPS) unit type information in an RTP header extension; and an ability to support codec capabilities to satisfy a minimum quality requirement for point cloud video.

7. The method of claim 6, wherein the RTP payload format comprises at least one supplemental information enhancement (SEI) message, wherein data carried in a point cloud video specific SEI message are used in a rendering phase at a receiver.

8. The method of claim 1, wherein the one or more Session Description Protocol (SDP) attributes indicate at least one of:
an ability to signal a desired viewport using an RTCP feedback message; and
an ability to signal an actually transmitted viewport using an RTP header extension message.

9. The method of claim 1, wherein each dedicated RTP stream includes a distinct media type.

10. The method of claim 1, wherein the method is performed by a user equipment (UE), a networked device, or an access node (AN).

11. A method for real time protocol (RTP) data streaming, the method comprising:
receiving, from a sender in a RTP extension message, data indicative of a viewport that is associated with a volumetric video in an RTP stream representing the volumetric video;
receiving, from the sender, one or more session description protocol (SDP) attributes to indicate capabilities for carriage of point cloud video as part of the RTP stream, the one or more SDP attributes for the RTP stream indicating an ability to carry point cloud metadata information as part of an RTP payload format;
de-multiplexing, into a plurality of codec bitstreams, the RTP stream representing the volumetric video;
decoding, from the plurality of codec bitstreams, based on the one or more SDP attributes, and based on the data indicative of the viewport, texture data comprising occupancy map data, geometry data, and attribute data for the volumetric video;
generating, from the texture data and the SDP attributes, a point cloud reconstruction for the volumetric video; and
rendering the volumetric video based on the point cloud reconstruction.

12. The method of claim 11, further comprising:
decoding, from the plurality of codec bitstreams, one or more supplemental information enhancement (SEI) messages including metadata for rendering the volumetric video.

13. The method of claim 11, further comprising decoding, from the plurality of codec bitstreams, patch sequence data, wherein generating the point cloud reconstruction is based on the patch sequence data.

14. The method of claim 11, wherein rendering the volumetric video comprises:
receiving, from a sensor associated with a device configured to display the volumetric video, sensor data indicative of a position of the display; and
rendering the volumetric video based on the sensor data indicative of the position.

15. The method of claim 11, wherein each codec bitstream includes a high efficiency video coding (HEVC) bitstream.

16. The method of claim 11, further comprising:
receiving an RTP header extension of the RTP stream, the RTP header extension configured to include a compressed patch sequence substream.

17. The method of claim 11, further comprising:
receiving data including one or more session description protocol (SDP) attributes to indicate capabilities for carriage of point cloud video as part of the RTP stream.

18. The method of claim 17, wherein the one or more SDP attributes for the RTP stream indicate at least one of:
an ability to carry encoded point cloud information on occupancy map data, geometry data, attribute data and patch sequence data in dedicated RTP streams;
an ability to carry the dedicated RTP streams on point cloud information such as occupancy map data, geometry data, attribute data, and patch sequence data in a single multiplexed RTP stream;
an ability to carry a sequence parameter set (SPS) unit type information in an RTP header extension;
an ability to carry point cloud metadata information as part of a RTP payload format; and
an ability to support codec capabilities to satisfy a minimum quality requirement for point cloud video.

19. The method of claim 17, wherein the one or more Session Description Protocol (SDP) attributes indicate at least one of:
an ability to signal a desired viewport using an RTCP feedback message; and
an ability to signal an actually transmitted viewport using an RTP header extension message.

20. The method of claim 11, wherein each codec bitstream includes a distinct media type.

\* \* \* \* \*